(12) United States Patent
Beauchamp

(10) Patent No.: US 12,426,593 B2
(45) Date of Patent: *Sep. 30, 2025

(54) MOTIVE DEVICE FOR WATERFOWL DECOY DEPLOYMENT SYSTEM

(71) Applicant: QUICKCOYS OUTDOOR PRODUCTS LLC, Macon, MO (US)

(72) Inventor: Keith Beauchamp, Macon, MO (US)

(73) Assignee: Quickcoys Outdoor Products LLC, Sherman, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,280

(22) Filed: Nov. 21, 2023

(65) Prior Publication Data

US 2024/0081320 A1    Mar. 14, 2024

Related U.S. Application Data

(63) Continuation of application No. 16/400,642, filed on May 1, 2019, now Pat. No. 11,825,832, which is a continuation of application No. 15/476,310, filed on Mar. 31, 2017, now Pat. No. 10,729,125, which is a continuation-in-part of application No. 15/216,927, filed on Jul. 22, 2016, now Pat. No. 10,111,417, which is a continuation-in-part of application No. 14/626,258, filed on Feb. 19, 2015, now Pat. No. 9,999,215.

(60) Provisional application No. 62/316,862, filed on Apr. 1, 2016.

(51) Int. Cl.
*A01M 31/06* (2006.01)

(52) U.S. Cl.
CPC .................................. *A01M 31/06* (2013.01)

(58) Field of Classification Search
CPC ...................................................... A01M 31/06
See application file for complete search history.

(56) References Cited

U.S. PATENT DOCUMENTS

| | | |
|---|---|---|
| 694,732 A | 3/1902 | Coudon |
| 970,003 A | 9/1910 | Wethall |
| 1,746,640 A | 2/1930 | Emoff |
| 2,547,286 A | 4/1951 | Sabin |
| 2,624,144 A | 1/1953 | Beverman |
| 3,950,883 A | 4/1976 | Shepherd |
| 4,141,167 A | 2/1979 | Muehl |
| 4,660,313 A | 4/1987 | Bauernfeind et al. |
| 6,079,140 A | 6/2000 | Brock, IV |
| 6,574,902 B1 | 6/2003 | Conger |
| 6,655,071 B2 | 12/2003 | Barnes et al. |
| 6,698,132 B1 | 3/2004 | Brint |
| 6,957,509 B2 | 10/2005 | Wright |

(Continued)

OTHER PUBLICATIONS

International Search Report and Written Opinion issued by the International Search Authority in PCT/US23/23949 mailed on Aug. 24, 2023, pp. 1-22.

*Primary Examiner* — Jessica B Wong
(74) *Attorney, Agent, or Firm* — Armstrong Teasdale LLP

(57) ABSTRACT

A waterfowl decoy deployment system includes a thrust device and a hub coupled to the thrust device. The waterfowl decoy deployment system also includes a plurality of arms coupled to the hub such that the plurality of arms extend radially outward from the hub. The thrust device is configured to rotate about an axis to induce a substantially circular motion to the hub and the plurality of arms.

20 Claims, 21 Drawing Sheets

(56) References Cited

U.S. PATENT DOCUMENTS

| | | |
|---|---|---|
| 7,043,865 B1 | 5/2006 | Crowe |
| 7,347,024 B1 | 3/2008 | Vest |
| 8,256,155 B1 | 9/2012 | Goodwill et al. |
| 8,887,433 B2 | 11/2014 | Luttrull |
| 9,572,339 B1 | 2/2017 | Dicken |
| 9,661,840 B1 | 5/2017 | Brain |
| 9,814,229 B1 | 11/2017 | Flake, Jr. et al. |
| 10,729,125 B2 | 8/2020 | Beauchamp |
| 11,825,832 B2 * | 11/2023 | Beauchamp .......... A01M 31/06 |
| 2002/0100206 A1 | 8/2002 | Brint |
| 2003/0061754 A1 | 4/2003 | Cicoff et al. |
| 2004/0025770 A1 | 2/2004 | Saunoris et al. |
| 2005/0150149 A1 | 7/2005 | Highby et al. |
| 2006/0016115 A1 | 1/2006 | Ware et al. |
| 2008/0295381 A1 | 12/2008 | Barr |
| 2009/0188148 A1 | 7/2009 | Orris et al. |
| 2009/0235571 A1 | 9/2009 | Wyant et al. |
| 2009/0260274 A1 | 10/2009 | Rogers |
| 2011/0303806 A1 | 12/2011 | Samaras et al. |
| 2012/0240447 A1 | 9/2012 | Gurner, III |
| 2013/0014422 A1 | 1/2013 | Bullerdick et al. |
| 2013/0212924 A1 | 8/2013 | Shisko |
| 2014/0224171 A1 | 8/2014 | Donoho |
| 2016/0100569 A1 | 4/2016 | Hudson |
| 2016/0242409 A1 | 8/2016 | Beauchamp |
| 2017/0099831 A1 | 4/2017 | Bullerdick et al. |
| 2019/0025427 A1 | 1/2019 | O'Keeffe |

* cited by examiner

MOTIVE DEVICE FOR WATERFOWL DECOY DEPLOYMENT SYSTEM

CROSS REFERENCE TO RELATED APPLICATIONS

This application is a continuation of U.S. patent application Ser. No. 16/400,642 filed May 1, 2019, which is a continuation of U.S. patent application Ser. No. 15/476,310 filed Mar. 31, 2017, and issued as U.S. Pat. No. 10,729,125, which is a continuation-in-part of U.S. patent application Ser. No. 15/216,927 filed Jul. 22, 2016, and issued as U.S. Pat. No. 10,111,417, which is a continuation-in-part of U.S. patent application Ser. No. 14/626,258, filed Feb. 19, 2015, and issued as U.S. Pat. No. 9,999,215 on Jun. 19, 2018, and also claims priority to U.S. Provisional Patent Application 62/316,862 filed Apr. 1, 2016, the contents of each of which are hereby incorporated by reference in their entirety.

BACKGROUND

The present disclosure relates generally to hunting decoys, and more particularly to motive devices, i.e., thrust bar systems for waterfowl deployment systems, e.g., duck decoy deployment systems.

Most known waterfowl decoy deployment systems are used by hunters to attract waterfowl, such as ducks, so that wild waterfowl are attracted to the decoys and will be brought into shooting range. Many of these known waterfowl decoy deployment systems use submerged components that are spreadable when deploying and collapsible when retrieving. Such known deployment systems typically include a plurality of decoys tethered in some manner to one or more extendable and retractable arms. Many of these known deployment systems experience similar problems.

One such problem is that once the systems are deployed, the decoys do not exhibit natural motion while floating on the surface of the water. For those deployment systems with a plurality of decoys, motion induced through water current and wind patterns does not appear natural to ducks. Also, use of individual motive devices on each individual duck decoy induces decoy motion that also does not appear natural to ducks, since ducks in a group tend to have some degree of synchronization in their movements.

BRIEF DESCRIPTION

In one aspect, a waterfowl decoy deployment system is provided. The waterfowl decoy deployment system includes a thrust device and a hub coupled to said thrust device. The waterfowl decoy deployment system also includes a plurality of arms coupled to the hub such that the plurality of arms extend radially outward from the hub. The thrust device is configured to rotate about an axis to induce a substantially circular motion to the hub and the plurality of arms.

In another aspect, method of assembling a waterfowl decoy deployment system is provided. The method includes coupling a thrust device to a hub and coupling a plurality of arms to the hub such that the plurality of arms extend radially outward from the hub. The thrust device is configured to rotate about an axis to induce a substantially circular motion to the hub and to the plurality of arms.

DRAWINGS

FIG. 1 is a schematic perspective view of a portion an exemplary waterfowl decoy deployment system;

FIG. 2 is a schematic perspective partially exploded view of a portion of the waterfowl decoy deployment system shown in FIG. 1;

FIG. 3 is a schematic cutaway side view of a portion of the waterfowl decoy deployment system shown in FIGS. 1 and 2 including an exemplary hub subsystem and an exemplary thrust bar system;

FIG. 4 is a schematic perspective top view of an exemplary casing that may be used with the hub subsystem shown in FIG. 3;

FIG. 5 is an overhead view of the thrust bar system shown in FIG. 3;

FIG. 6 is a perspective view of the thrust bar system in a partially disassembled state;

FIG. 7 is a bottom view of a portion the thrust bar assembly illustrating an exemplary thrust device;

FIG. 8 is a perspective view of an exemplary enclosure illustrating an exemplary power source and an exemplary programming device that may be used with the thrust bar system.

FIG. 9 is a block diagram of a programming device that may be used with the thrust bar system.

FIG. 10 is a schematic side view of an exemplary handle device and an exemplary hub cap that may be used with the waterfowl decoy deployment system shown in FIGS. 1 and 2;

FIG. 11 is a schematic cutaway perspective view of the handle device shown in FIG. 10;

FIG. 12 is a schematic perspective view of an exemplary arm suspension mechanism, i.e., a spring adaptor assembly that may be used with the hub subsystem shown in FIG. 3;

FIG. 13 is a schematic exploded view of the spring adaptor assembly shown in FIG. 12;

FIG. 14 is a schematic perspective bottom view of a portion of the waterfowl decoy deployment system shown in FIGS. 1 and 2;

FIG. 15 is a schematic side view of an exemplary anchor plate that may be used with the waterfowl decoy deployment system shown in FIGS. 1 and 2;

FIG. 16 is a schematic overhead view of the hub cap shown in FIG. 2 and a portion of an exemplary decoy tether guide subsystem;

FIG. 17 is a schematic perspective overhead view of the hub cap shown in FIGS. 2 and 16;

FIG. 18 is a schematic side view of the hub cap shown in FIGS. 2, 16, and 17;

FIG. 19 is a schematic bottom view of the hub cap shown in FIGS. 2, 16, 17, and 18;

FIG. 20 is a schematic overhead view of a deployably extendable and flexibly collapsible arm and another portion of the exemplary decoy tether guide subsystem that may be used with the waterfowl decoy deployment system shown in FIGS. 1 and 2;

FIG. 21 is a schematic perspective view of a portion of the deployably extendable and flexibly collapsible arm shown in FIG. 20;

FIG. 22 is a schematic longitudinal view of a portion of the deployably extendable and flexibly collapsible arm shown in FIG. 20;

FIG. 23 is a schematic overhead view of the portion of the deployably extendable and flexibly collapsible arm shown in FIG. 20;

FIG. 24 is a schematic perspective view of another portion of the deployably extendable and flexibly collapsible arm; and FIG. 25 is another schematic perspective view of the portion of the deployably extendable and flexibly collapsible arm shown in FIG. 24.

DETAILED DESCRIPTION

The exemplary methods and apparatus described herein overcome at least some disadvantages of known waterfowl decoy deployment systems by providing a motive mechanism, i.e., a thrust bar system that induces motive forces in floating decoys to simulate natural duck swimming movements on the surface of the water. Specifically, the thrust bar system uses a plurality of small electric motor-driven propellers to induce a substantially circular swimming motion to a tethered duck decoy system that includes a plurality of decoys. The electric power source is one of a waterproof rechargeable DC battery that is submerged in the vicinity of the decoy deployment system and/or an energy storage and delivery system that may be on-shore or on a nearby floating platform out of view of passing ducks, i.e., in nearby duck blinds.

Figure 1:
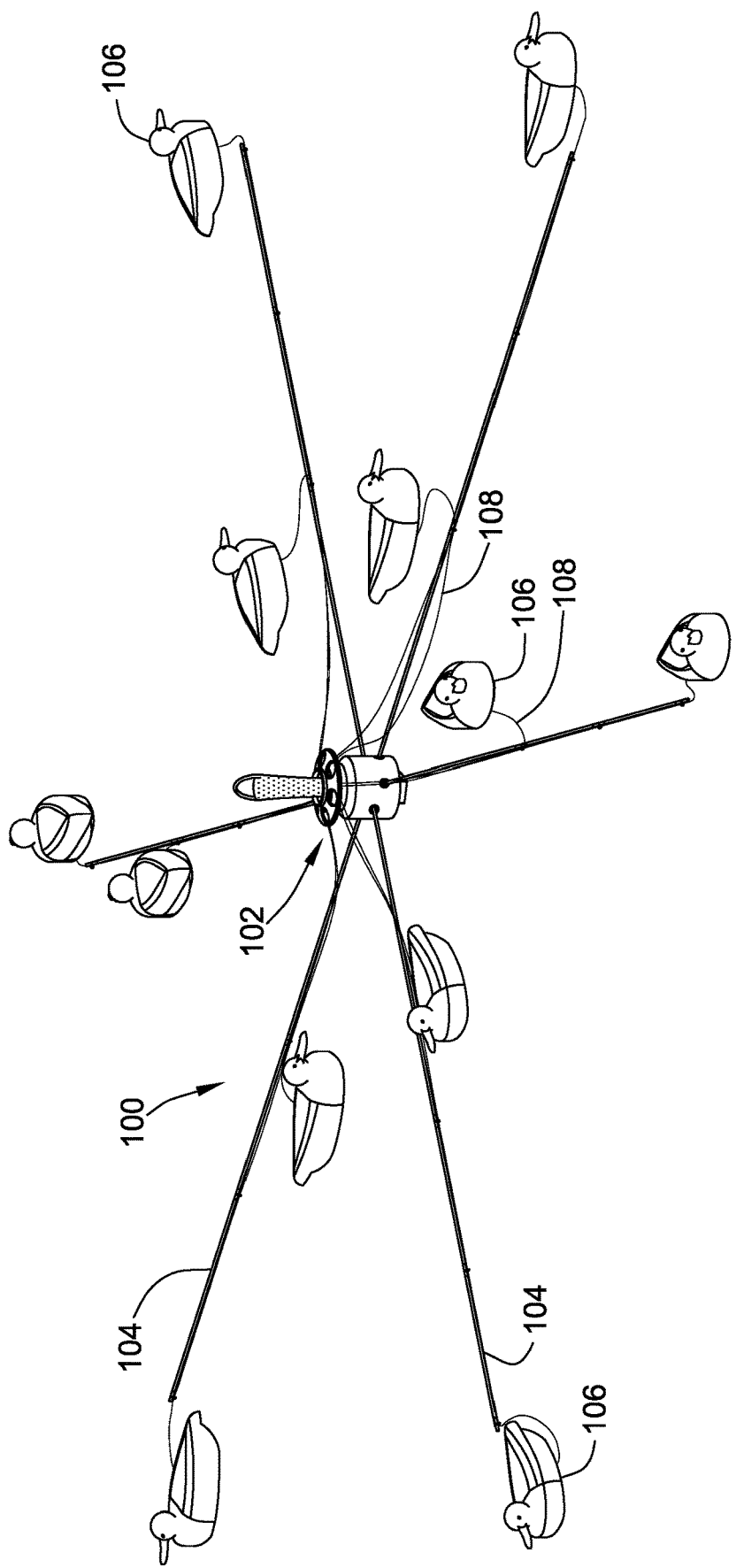
FIGS. 1-25 show exemplary embodiments of the apparatus described herein.

FIG. 1 is a schematic perspective view of an exemplary waterfowl, i.e., duck decoy deployment system 100. Alternatively, decoy deployment system 100 is adaptable for any other waterfowl including, without limitation, geese and swan. Duck decoy deployment system 100 includes a hub subsystem 102 located substantially at a center portion of system 100. Duck decoy deployment system 100 also includes a plurality of deployably extendable and flexibly collapsible arms 104 coupled to, and extending radially outward from, hub subsystem 102. In the exemplary embodiment, system 100 includes six substantially identical, fixed length arms 104. Alternatively, system 100 includes any number of arms 104 having any configuration including, without limitation, varying lengths and materials. Duck decoy deployment system 100 further includes a plurality of waterfowl, i.e., duck decoys 106 coupled to each arm 104 through a respective decoy tether 108, where some of tethers 108 have varying lengths (discussed further below). In the exemplary embodiment, system 100 includes at least one duck decoy 106 coupled to each arm 104, where, in the exemplary embodiment, two duck decoys 106 per arm 104 are shown for a total of twelve decoys 106. Alternatively, system 100 includes any number of duck decoys 106 having any configuration including, without limitation, varying lengths and materials.

Figure 2:
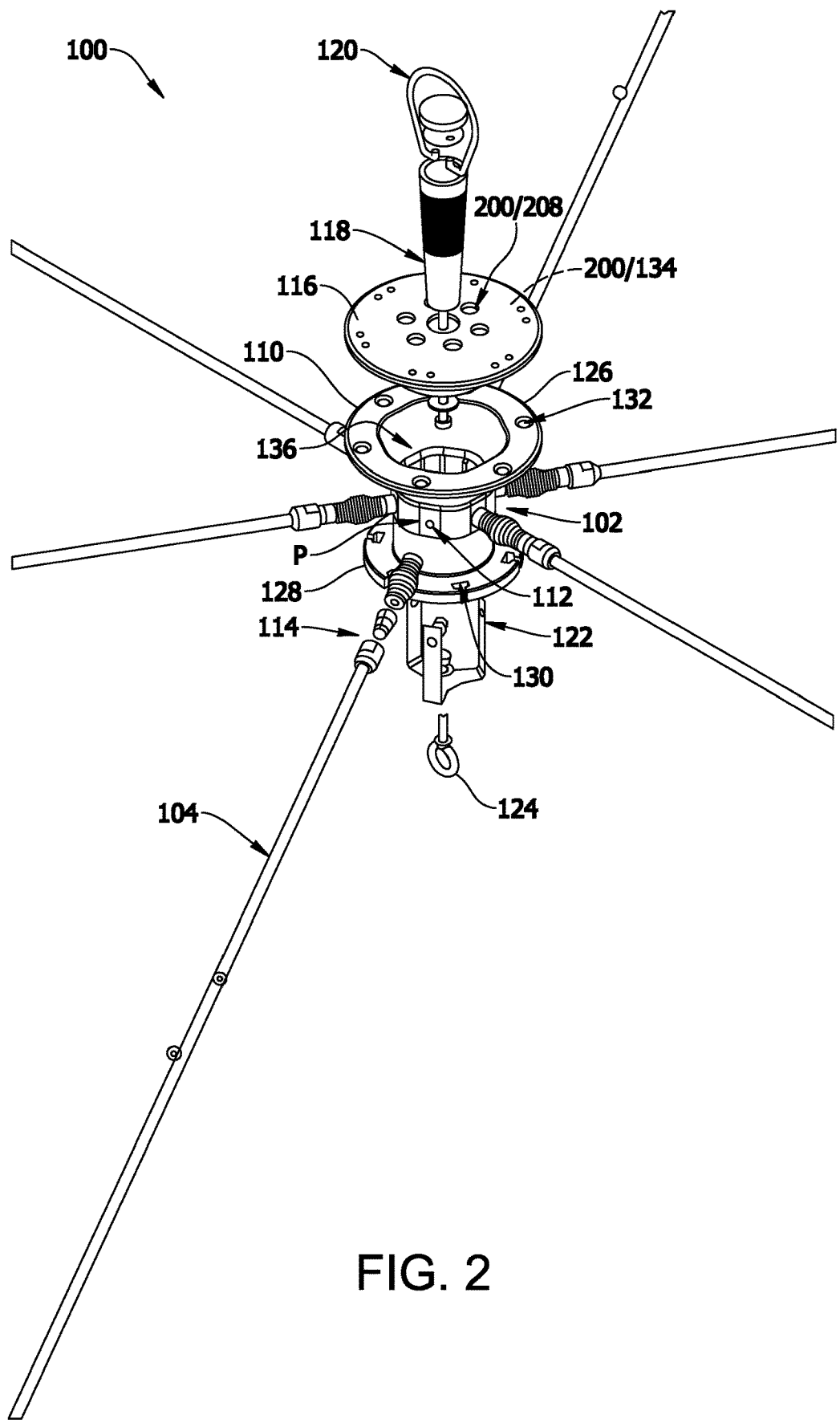

FIG. 2 is a schematic perspective partially exploded view of a portion of duck decoy deployment system 100. Duck decoys 106 and tethers 108 (not shown in FIG. 1) are not shown in FIG. 2 for clarity. Hub subsystem 102 includes a casing 110 that defines an external circumferential perimeter P. While casing 110 is substantially cylindrical in shape, any shape that enables operation of system 100 as described herein is used, including, without limitation, rectangular. Casing 110 defines a plurality of arm apertures 112 positioned about perimeter P. Duck decoy deployment system 100 includes a plurality of arm suspension mechanisms, i.e., a spring adaptor assembly 114. Each spring adaptor assembly 114 is inserted into a respective arm aperture 112.

In the exemplary embodiment, there are six spring adaptor assemblies 114 positioned approximately 60° apart from each other along circumferential perimeter P of casing 110. In general, spring adaptor assemblies 114 are positioned about circumferential perimeter P of casing 110 at circumferential positions of approximately 360 degrees divided by the number of arms 104. As such, hub subsystem 102 is substantially symmetrical. Alternatively, hub subsystem 102 has any configuration with any number of spring adaptor assemblies 114 and arms 104 that enable operation of system 100 as described herein.

Duck decoy deployment system 100 also includes a hub cap 116 coupled to the top of casing 110. A handle device 118 is coupled to hub cap 116, where handle device 118 extends longitudinally outward from hub subsystem 102. A wire loop 120 is coupled to handle device 118, where wire loop 120 extends from handle device 118. Handle device 118 and wire loop 120 facilitate placement and recovery of system 100 in aqueous environments through either hand placement or a hooked rod. Alternatively, any handling device that enables operation of system 100 as described herein is used, including, without limitation, an eye device that facilitates placement with a hook device.

Duck decoy deployment system 100 further includes an anchor plate 122 inserted within and coupled to the bottom of casing 110. Anchor plate 122 receives a weight coupling device, i.e., an anchor eye bolt 124, where anchor eye bolt 124 extends longitudinally outward from hub subsystem 102. Alternatively, any weight coupling device is used that enables operation of system 100 as described herein, including, without limitation, a weight device that couples directly to the bottom of casing 110.

Figure 3:
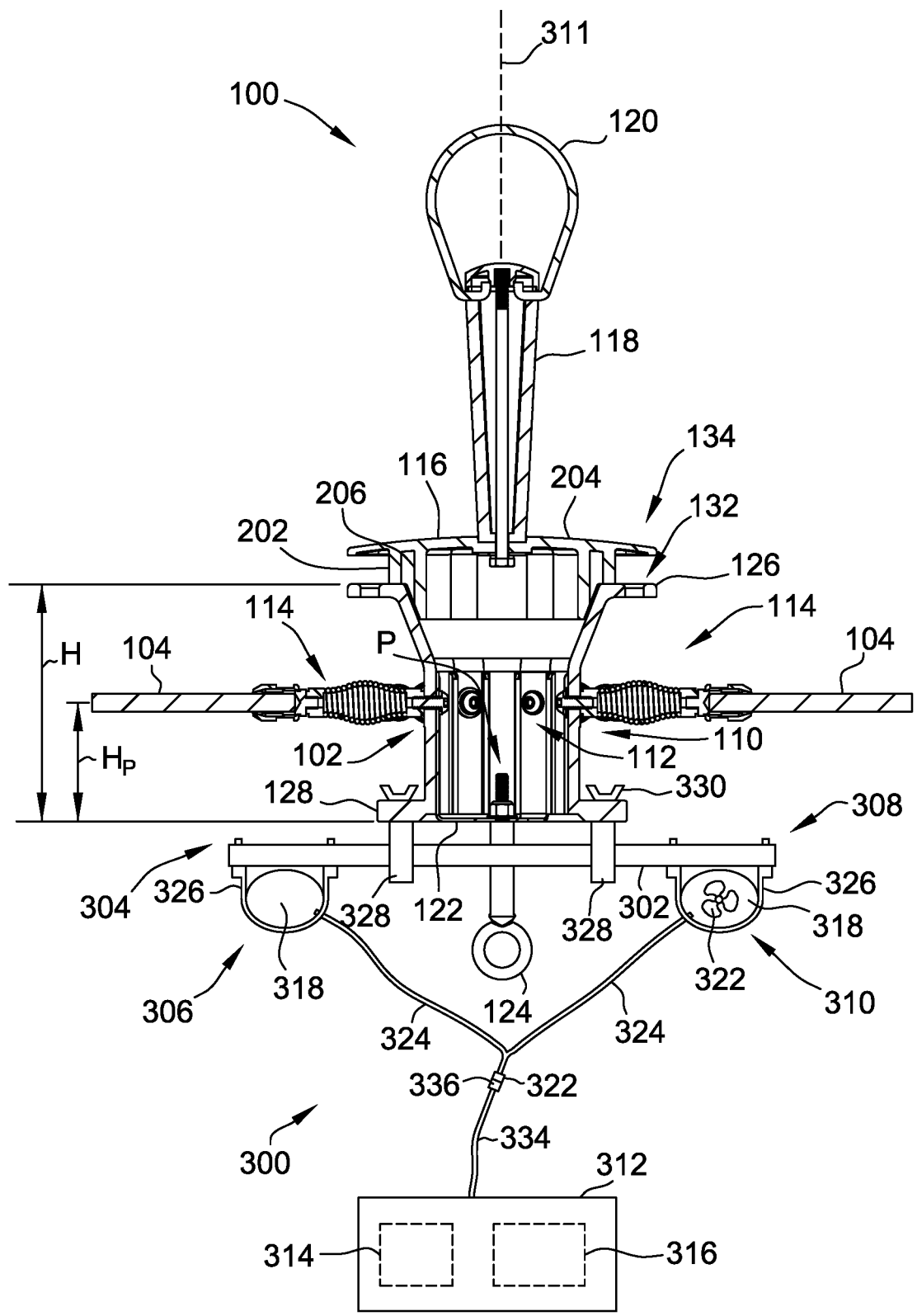
Figure 4:
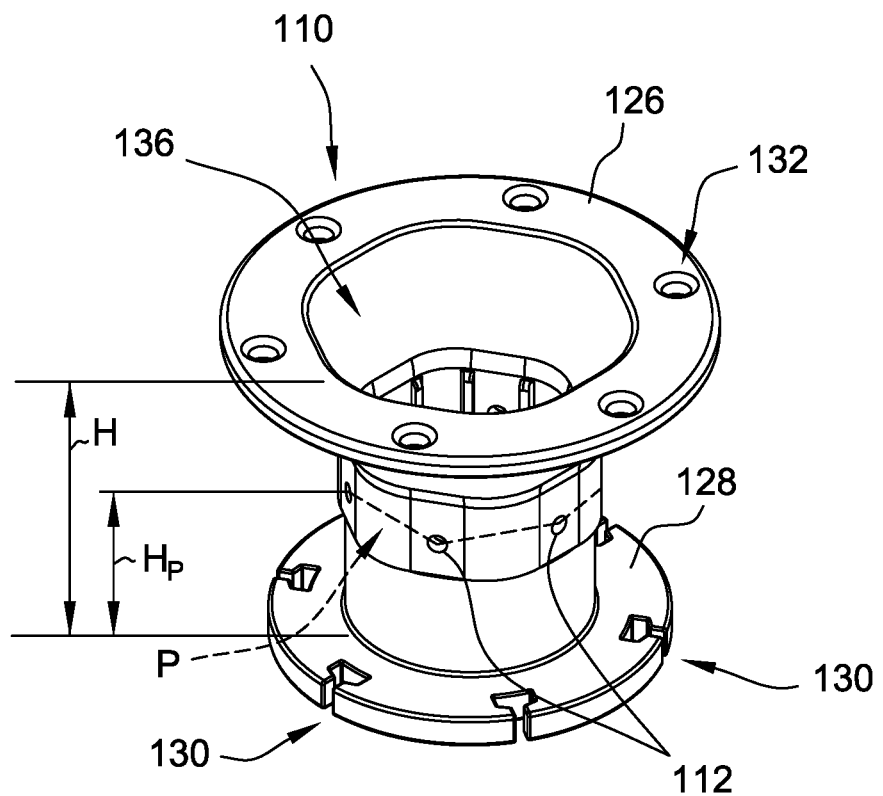

FIG. 3 is a schematic cutaway side view of a portion of duck decoy deployment system 100 including hub subsystem 102 and motive system or thrust bar system 300. FIG. 4 is a schematic perspective top view of casing 110. Referring to FIGS. 3 and 4, casing 110 of hub subsystem 102 includes an upper flange 126 and a bottom flange 128 longitudinally opposite upper flange 126. Upper flange 126 receives hub cap 116. Bottom flange 128 defines a plurality of line slots 130 therein. Line slots 130 are configured to receive a thrust bar system 300 therein, where line slots 130 are configured to couple thrust bar system 300 to casing 110 to facilitate motion of duck decoys 106 (shown in FIG. 1), as described in further detail below. Line slots 130 are also configured to receive an anchor line (not shown), where the anchor line extends through two or more line slots 130 and is wrapped, at least partially, about a portion of bottom flange 128 to facilitate reducing a potential for slippage of the anchor line off of casing 110.

Casing 110 defines a casing height H, external circumferential perimeter P, where apertures 112 are positioned at a substantially similar height HP. Upper flange 126 defines a plurality of tether guide openings 132 circumferentially positioned on flange 126 to substantially line up with, i.e., circumferentially coincide with apertures 112. In the exemplary embodiment, in a manner similar to spring adaptor assemblies 114 and apertures 112, tether guide openings 132 are positioned approximately 60° apart from each other along upper flange 126. In general, tether guide openings 132 are positioned about upper flange 126 at circumferential positions of approximately 360 degrees divided by the number of tether guide openings 132. Similarly, hub cap 116 defines a plurality of pairs of tether guide openings 134 circumferentially positioned on hub cap 116 to substantially line up with, i.e., circumferentially coincide with tether guide openings 132. In a manner similar to tether guide openings 132, pairs of tether guide openings 134 are positioned approximately 60° apart from each other along hub cap 116. In general, pair of tether guide openings 134 are positioned about hub cap 116 at circumferential positions of approximately 360 degrees divided by the number of pairs of tether guide openings 134. Tether guide openings 132 and 134 partially define a decoy tether guide subsystem (described further below) configured to receive respected tethers 108 (shown in FIG. 1) therethrough and reduce a potential for entanglement of tethers 108. Casing 110 defines an interior chamber In the exemplary embodiment, decoy deployment system 100 includes thrust bar system 300 coupled to hub subsystem 102. More specifically, thrust bar system 300 is coupled to casing 110 of hub subsystem 102 and is positioned below hub subsystem 102 and arms 104 such that thrust bar system 300 is submerged beneath the water level. As shown in FIG. 3, thrust bar system 300 includes a thrust bar 302 coupled to casing 110 of hub subsystem 102. Thrust bar 302 includes a first end 304 having a first thrust device 306 coupled thereto and a second end 308 having a second thrust device 310 coupled thereto. As described herein, thrust devices 306 and 310 rotate thrust bar 302 about a rotational axis 311 to induce a substantially circular motion to hub subsystem 102. In the exemplary embodiment, thrust bar system 300 also includes an enclosure 312 that houses a power source 314 for providing power to thrust devices 306 and 310 and also a programming device 316 for controlling operation of thrust devices 306 and 310.

Figure 5:
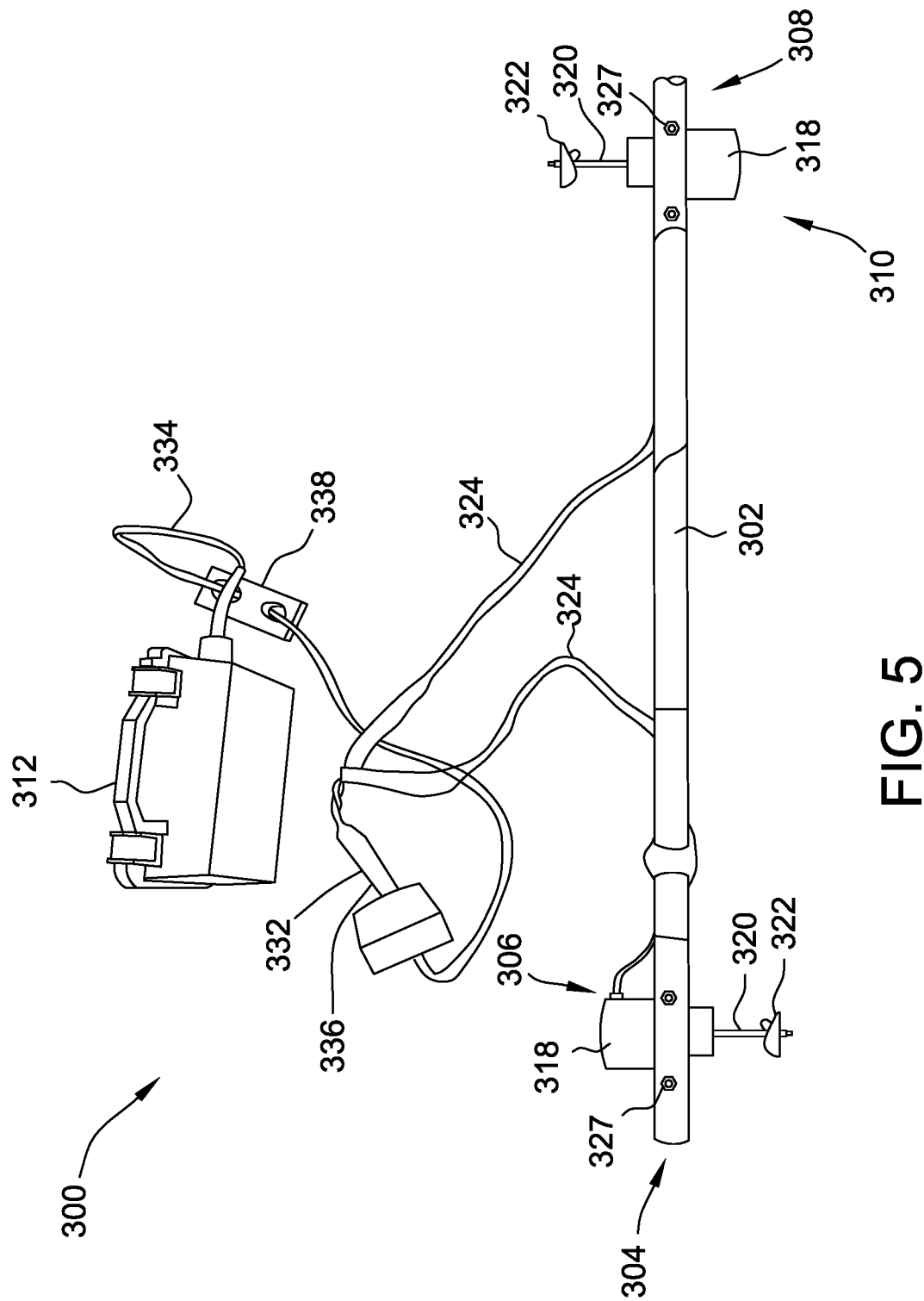
Figure 6:
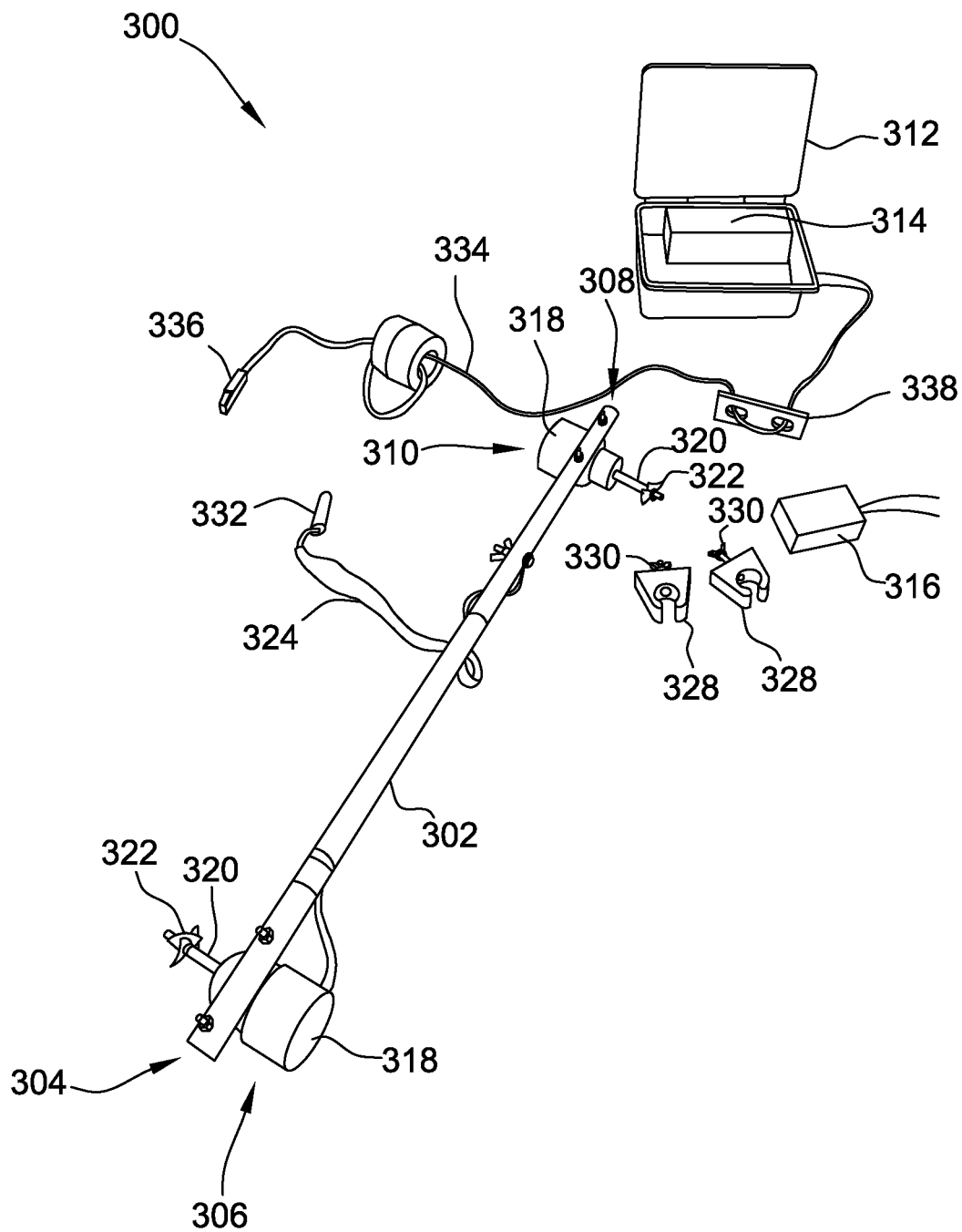
Figure 7:
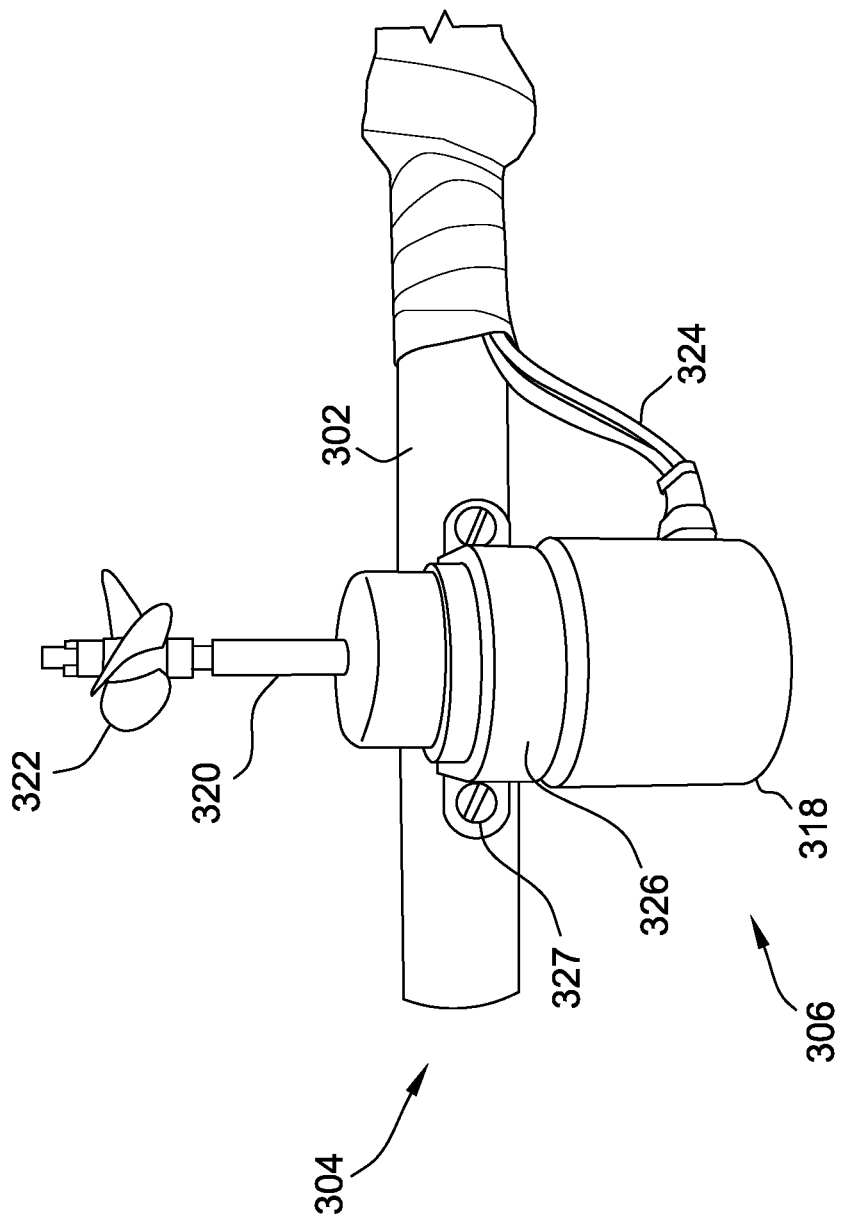
Figure 8:
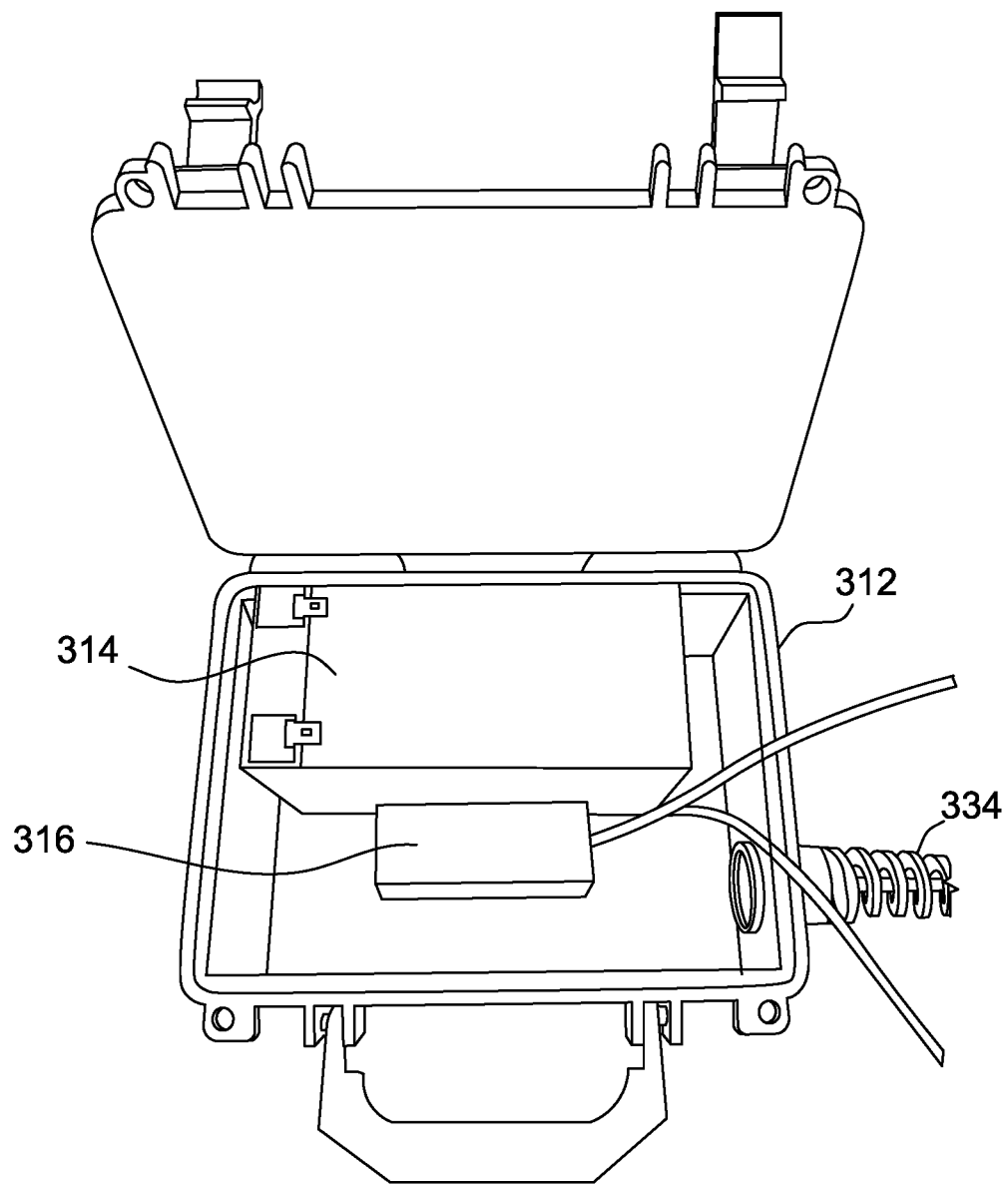

FIG. 5 is an overhead view of thrust bar system 300. FIG. 6 is a perspective view of thrust bar system 300 in a partially disassembled state. FIG. 7 is a bottom view of a portion thrust bar system 300 illustrating thrust device 306. FIG. 8 is a perspective view of enclosure 312 illustrating power source 314 and a programming device 316 that may be used with thrust bar system 300.

Referring to FIGS. 3 and 5-8, each thrust device 306 and 310 includes a motor 318, a shaft 320 coupled to motor 318, and a propeller 322 coupled to shaft 320. As described herein, motor 318 receives electrical energy from power source 314 via a power cord 324 such that motor 318 rotates propeller 322 according to a predetermined mode of operation. In the exemplary embodiment, a U-bracket 326 couples thrust devices 306 and 310, and more specifically, motors 318, to thrust bar 302 using a plurality of fasteners 327. In other embodiments, thrust devices 306 and 310 are coupled to thrust bar 302 using any means that facilitates operation of thrust bar system 300 as described herein.

In the exemplary embodiment, motors 318 are sealed marine motors that are sized to balance thrust applied to decoy system with speed of rotation of decoy system. For example, motors 318 may be 12 volt or 5 amp motors that are powered by power source 314. Furthermore, as described herein, motors 318 are reverse polarity motors that are able to rotate shaft 320 in two directions (i.e., clockwise and counter-clockwise) based on a desired operating mode. Additionally, in the exemplary embodiment, propellers 322 include a diameter within a range of approximately 25 millimeters (mm) and approximately 50 mm. In one embodiment, propellers 322 are formed from a hard plastic material. Alternatively, propellers 322 may be formed from any material, such as, but not limited to, rubber or metal, that facilitates operation of thrust bar system 300 as described herein.

Furthermore, as best shown in FIGS. 3, 5, and 6, first thrust device 306 and its motor 318, shaft 320, and propeller 322 are oriented in a first direction, while second thrust device 310 and its motor 318, shaft 320, and propeller 322 are oriented in a second direction that is opposite the first direction of first thrust device 306. Additionally, thrust devices 306 and 310 are positioned equidistant from rotational axis 311 to balance thrust and provide even rotation. In such a configuration, rotation of propellers 322 induces a substantially circular motion to thrust bar 302 about axis 311. Because thrust bar 302 is coupled to casing 110, as described herein, rotation of thrust bar 302 causes rotation of hub subsystem 102, arms 104 and decoys 106.

As best shown in FIG. 3, thrust bar system 300 includes a plurality of coupling devices 328 that couple thrust bar system 300 to hub subsystem 102 of decoy deployment system 100. More specifically, thrust bar system 300 includes a pair of coupling devices 328 coupled to a pair of opposing slots of the plurality of circumferentially-spaced line slots 130 (shown in FIG. 4) in bottom flange 128 of casing 110. Coupling devices 328 each include a fastener 330 that may be inserted into a corresponding line slot 130 to removably attach coupling devices 328 to bottom flange 128 of casing 110 of hub subsystem 102. As such, coupling devices 328 facilitate coupling thrust bar 302 to bottom flange 128 of casing 110. In the exemplary embodiment, thrust bar 302 is coupled to coupling devices 328 via snap fit connection such that thrust bar 302 is removable from coupling devices 320. In other embodiments, coupling devices 328 are attached to thrust bar 302 in any manner that facilitates operation of decoy deployment system 100 as described herein. When coupled together, thrust bar system 300, hub subsystem 102, plurality of arms 104, and plurality of decoys 106 form an integral unit that may be dropped into a body of water in a ready-for-use state.

As shown in FIGS. 3 and 5-8, a power cord 324 extends from each motor 318 of thrust devices 306 and 310. In the exemplary embodiment, power cords 324 are spliced together and form a first electrical disconnect 332. Similarly, a power cord 334 extends from power source 314 and includes a second electrical disconnect 336. Electrical disconnects 332 and 336 couple power source 314 in electrical communication with motors 318 of thrust devices 306 and 310 to provide power to motors 318. Electrical disconnects 332 and 336 also provide a simple mechanism to selectively couple power source 314, and optional enclosure 312, to motors 318 on thrust bar 302. Furthermore, thrust bar system 300 includes a power cable tether 338 coupled to power cord 334. Cable tether 338 facilitates maintaining power cables proximate power source 314 and thrust bar 302 to reduce a potential for drifting and entanglement of power cords 324 and 334.

In the exemplary embodiment, power source 314 is a sealed, water-proof, rechargeable battery that is positioned within enclosure 312 and located beneath the water line such that power source 314 and enclosure 312 are submerged. Power source 314 may be a lead-acid battery, a nickel-cadmium battery, a lithium-ion battery, or any type of battery that enables operation of thrust bar system 300 as described herein. For example, power source 314 may include the follow specifications: 2 volts DC; 7 Ampere-hours (AH); 13.5-13.8 volts of direct current (VDC) on standby; 14.1-14.4 VDC during cycle use; initial current of 0.1 Coulombs per second (C); and a maximum cycle use of 0.25 C. Alternatively, power source 314 includes any operating specifications that facilitate operation of thrust bar system 300 as described herein. Power source 314 also includes a power switch (not shown) that may be operated manually and/or wirelessly via a remote mobile device. In embodiments having power source 314 in enclosure 312, enclosure 312 may be attached to eye bolt 124 such that enclosure 312, power source 314, and programming device 316 serve as at least a portion of the weight that submerges hub subsystem 102 and thrust bar system 300.

In another embodiment, thrust bar system 300 includes a remote power source to provide power to thrust devices 306 and 310. Such a remote power source includes a more robust battery system, e.g., one or more rechargeable 12 VDC deep-cycle batteries connected in parallel to extend capacity. This alternate power source is hard-wired to thrust devices 306 and 310 and may be located on-shore or on a nearby floating platform in a duck blind such that the alternate power source is not located within enclosure 312 and submerged beneath the water line. The alternative power source is connected to thrust devices 306 and 310 through a waterproof power cord longer than that of 334 as shown in FIG. 3. Additionally, the alternative power source includes a power switch either on the cord or on the power source itself that may be operated manually and/or wirelessly via a remote mobile device. Furthermore, the remote power source may be configured to be recharged away from the vicinity of the selected location for placement of decoy deployment system 100 through one or more of a proximate engine-driven generator (e.g., and without limitation, a gasoline-driven or diesel-driven automotive alternator), a solar array through a proximate DC-to-DC power converter, and/or a standard 110 volt alternating current source through a proximate AC-to-DC power converter.

Figure 9:
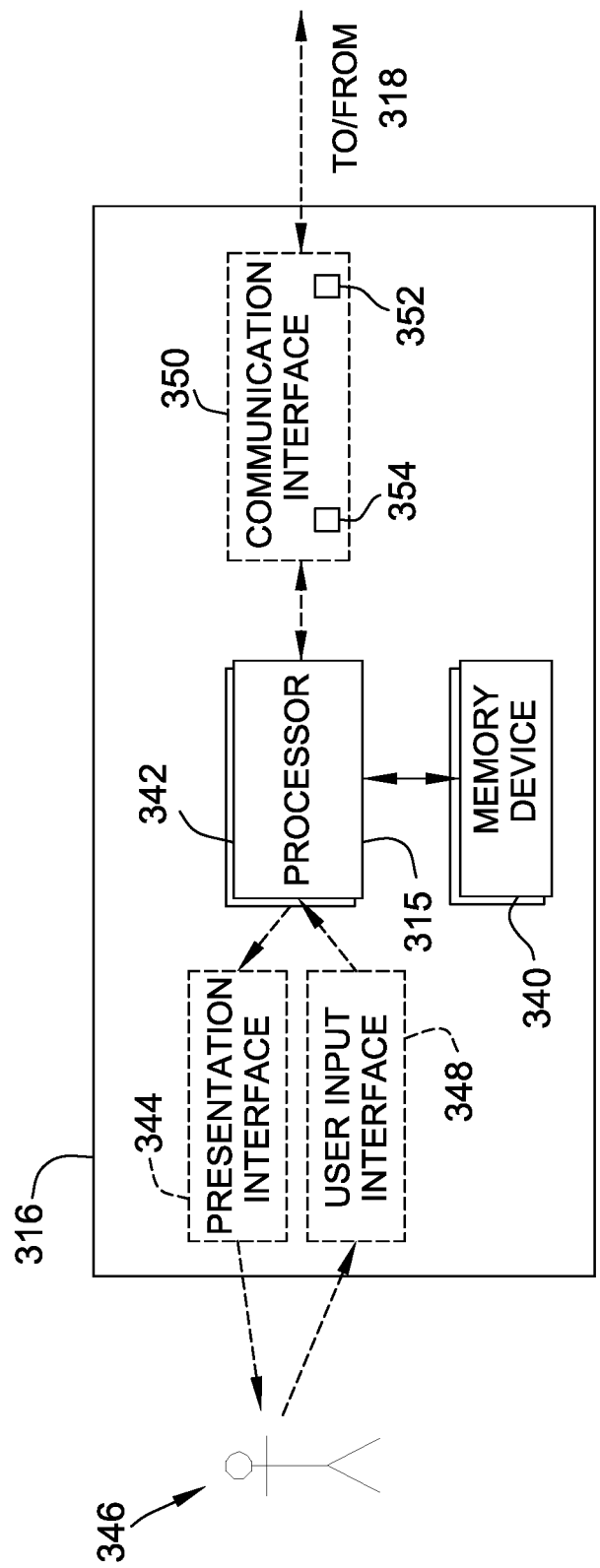

FIG. 9 is a block diagram of motor programming device 316 that may be used with thrust bar system 300. Motor programming device 316 includes at least one memory device 340 and a processor 342 that is coupled to memory device 340 for executing instructions. In some embodiments, executable instructions are stored in memory device 340. In the exemplary embodiment, motor programming device 316 performs one or more operations described herein by programming processor 342. For example, processor 342 may be programmed by encoding an operation as one or more executable instructions and by providing the executable instructions in memory device 340.

Processor 342 may include one or more processing units (e.g., in a multi-core configuration). Further, processor 342 may be implemented using one or more heterogeneous processor systems in which a main processor is present with secondary processors on a single chip. As another illustrative example, processor 342 may be a symmetric multi-processor system containing multiple processors of the same type. Further, processor 342 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 342 controls operation of motors 318 of thrust devices 306 and 310.

In the exemplary embodiment, memory device 340 is one or more devices that enable information such as executable instructions and/or other data to be stored and retrieved. Memory device 340 may include one or more computer readable media, such as, without limitation, dynamic random access memory (DRAM), static random access memory (SRAM), a solid state disk, and/or a hard disk. Memory device 340 may be configured to store, without limitation, application source code, application object code, source code portions of interest, object code portions of interest, configuration data, execution events and/or any other type of data. In the exemplary embodiment, memory device 340 includes firmware and/or initial configuration data for motors 318.

In the exemplary embodiment, motor programming device 316 includes a presentation interface 344 that is coupled to processor 342. Presentation interface 344 presents information, such as an application menu and/or execution events, to a user 346. For example, presentation interface 344 may include a display device, such as a cathode ray tube (CRT), a liquid crystal display (LCD), an organic LED (OLED) display, and/or an "electronic ink" display. In some embodiments, presentation interface 344 includes one or more display devices.

In the exemplary embodiment, motor programming device 316 includes a user input interface 348 that is coupled to processor 342 and receives input from user 346. User input interface 348 may include, for example, a keyboard, a pointing device, a mouse, a stylus, and/or a touch sensitive panel (e.g., a touch pad or a touch screen). A single component, such as a touch screen of a mobile device (e.g., a smartphone or tablet computer), may function as both a display device of presentation interface 344 and user input interface 348.

Motor programming device 316 includes a communication interface 350 coupled to processor 342. Communication interface 350 communicates with one or more remote devices, such as motors 318. In the exemplary embodiment, communication interface 350 includes a wireless communications module 352 that enables wireless communication and a signal converter 354 that converts wireless signals received by wireless communications module 352. For example, in one embodiment, signal converter 354 converts a motor configuration data signal into a radio signal for transmission to an antenna (not shown) on motors 318. In another embodiment, signal converter 354 coverts a received radio signal from motors 318 into motor diagnostic data for analyzing operations of motors 318.

In the exemplary embodiment, programming device 316 is configured to control operation of thrust devices 306 and 310, and more specifically, programming device 316 controls operation of motors 318 of thrust devices 306 and 310. As described above, programming device 316 communicates wirelessly with presentation interface 344 and user input interface 348 and with motors 318 to operate motors 318 in accordance with a predetermined operating mode. In other embodiments, programming device 316 is physically coupled to motors 318 through wiring and only communicates wirelessly with presentation interface 344 and user input interface 348 to control motors 318. As described above, presentation interface 344 and user input interface 348 may include a single device, such as, but not limited to a smartphone or tablet.

In operation, power source 314 and programming device 316 are activated to provide power and operating instructions to motors 318. As described herein, thrust devices 306 and 310 are oriented in opposite directions such that propellers 322 drive thrust bar system 300 and hub subsystem 102 to rotate about axis 311 in either a clockwise or a counter-clockwise direction. In such a configuration, for example, motors 318 have opposite polarities such that propellers 322 are rotating to cause first thrust device 306 to "push" and second thrust device 310 to "pull" thrust bar system 300 through the water. After a predetermined amount of time, programming device 316 signals to both motors 318, through communication interface 350, to switch polarity such that each motor 318 changes the direction in which shaft 320 rotates. Changing the polarity of motors 318 causes propellers to change direction such that first thrust device 306 is now "pulling" and second thrust device 310 is now "pushing" thrust bar system 300 through the water.

Accordingly, in the exemplary embodiment, programming device 316 automatically controls the polarity of current flow from power source 314 to motors 318 for a predetermined, programmed duration for each polarity in a repeatable sequence to control the direction of rotation of motors 318 to control the direction of rotation of thrust bar system 300. For example, programming device 316 operates motors 318 for a first duration at a first respective polarity to rotate thrust bar system 300 in a first direction (clockwise or counter-clockwise), then, optionally, stops operation of motors 318 for a second duration, and then operates motors 318 for a third duration at a second respective polarity to rotate thrust bar system 300 in a second direction opposite to the first direction. Programming device 316 may then repeat the entire sequence a predetermined number of times or for a predetermined duration. More specifically, and without limitation, programming device 316 operates motors 318 for 20 seconds at a first respective polarity to rotate thrust bar system 300 in a clockwise direction (or counter-clockwise). Then, optionally, programming device 316 stops operation of motors 318 for 10 seconds while thrust bar system continues to drift in the clockwise direction. Programming device 316 may then operate motors 318 for 20 seconds at a second respective polarity, opposite the first polarity, to rotate thrust bar system 300 in a counter-clockwise direction. In the exemplary embodiment, the duration of each step in the sequence is adjustable by user 346 via programming device 316 as environmental conditions warrant. Rotating thrust bar system 300 in different directions not only reduces the potential for excessive winding of power cords 324 and 334 during operation, but also emulates natural duck motion as described herein.

Figure 10:
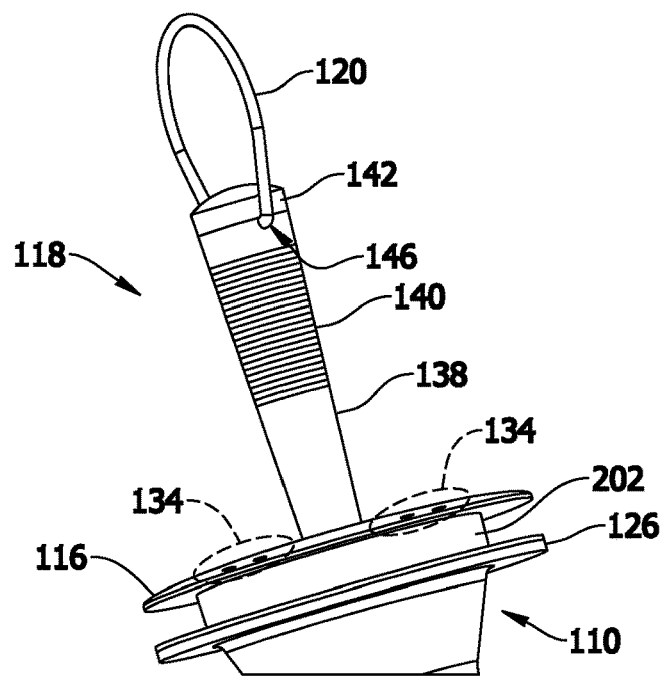
Figure 11:
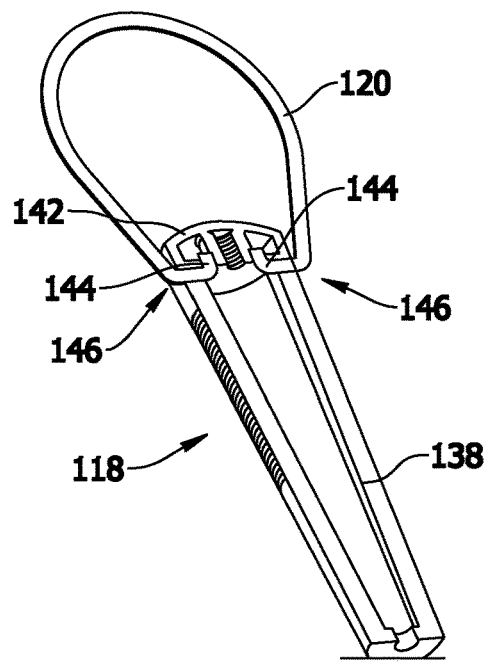

FIG. 10 is a schematic side view of handle device 118 and hub cap 116 that may be used with duck decoy deployment system 100 (shown in FIGS. 1-3). FIG. 11 is a schematic cutaway perspective view of handle device 118. In the exemplary embodiment, handle device 118 is coupled to hub subsystem 102 through hub cap 116 with a combination of fastening hardware (not shown) and a friction fit. Alternatively, handle device 118 is coupled to hub cap 116 through any means that enables operation of system 100 as described herein, including, without limitation, adhesives and threaded fixtures. Handle device 118 includes a substantially frusto-conical handle 138 extending longitudinally outward from hub cap 116, where at least a portion of handle 138 includes a hand grip 140 (only shown in FIG. 10). Alternatively, handle 138 has any shape, configuration, and orientation that enables operation of system 100 as described herein. Handle device 118 also includes a handle cap 142 coupled to handle 138 through any means that enables operation of system 100 as described herein, including, without limitation, threaded fixtures, fastening hardware, and adhesives. Handle cap 142 receives a portion 144 of wire loop 120 through apertures 146 defined in handle 138 proximate handle cap 142.

Figure 12:
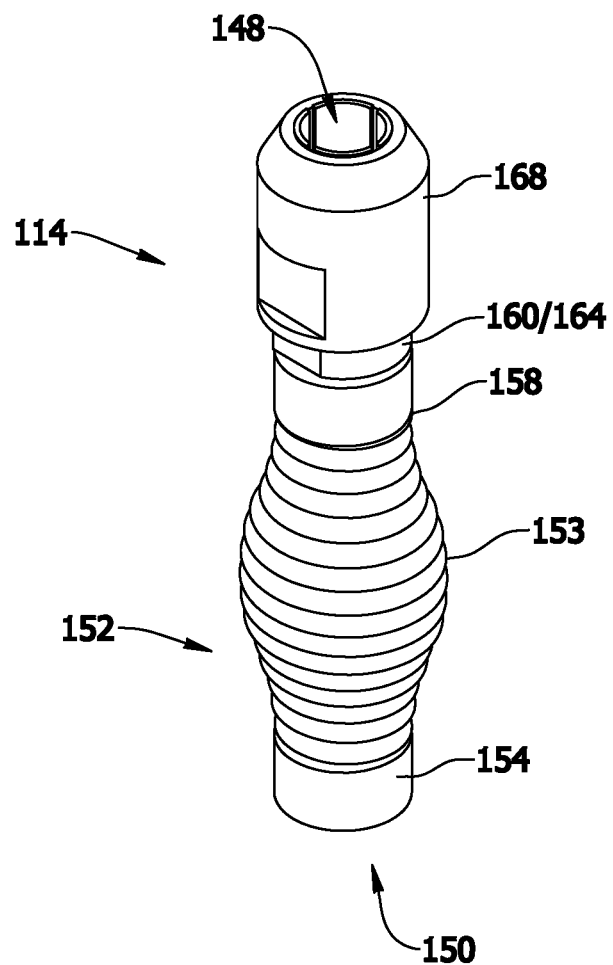
Figure 13:
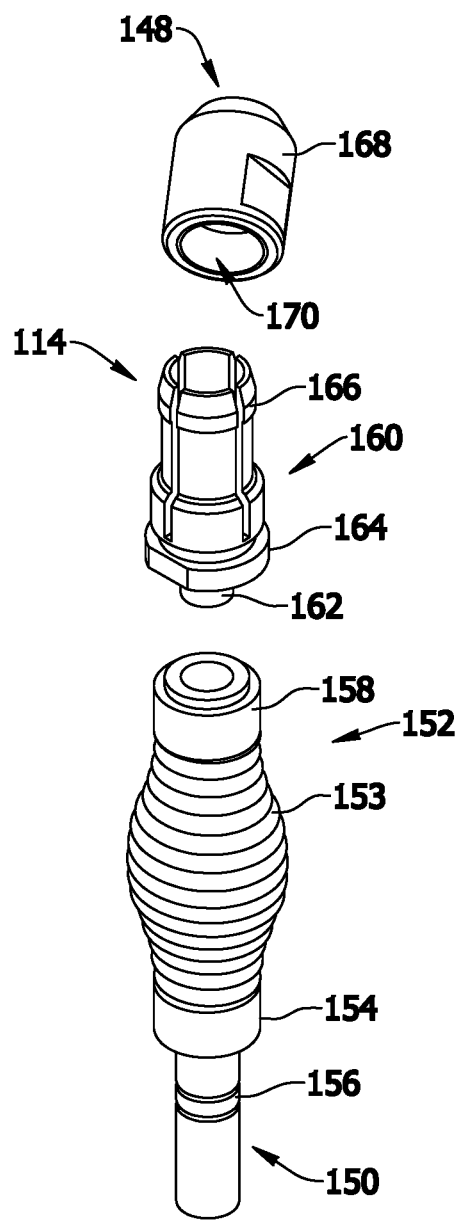

FIG. 12 is a schematic perspective view of arm suspension mechanism, i.e., spring adaptor assembly 114 that may be used with hub subsystem 102 (shown in FIG. 3). FIG. 13 is a schematic exploded view of spring adaptor assembly 114. Spring adaptor assembly 114 defines an arm cavity 148 configured to receive an arm 104 (shown in FIGS. 1-3). Spring adaptor assembly 114 also defines a casing end 150 configured to be received within arm apertures 112 (shown in FIGS. 2-4).

Spring adaptor assembly 114 includes a biasing device 152 that is inserted into inserted into arm apertures 112. In the exemplary embodiment, biasing devices 152 includes a constant-pitch, variable-diameter, constant-rate (i.e., a substantially non-varying spring constant with a predefined linearity) helical compression spring mechanism, or spring 153. Alternatively, biasing devices 152 are any devices that enable operation of duck decoy deployment system 100 as described herein, including, without limitation, biased hinge devices, variable- and multiple-pitch springs, constant-diameter springs (i.e., conical springs), and multiple rate springs. Biasing device 152 includes a casing collar 154 and insert hardware 156 (only shown in FIG. 13) for coupling biasing device 152 to casing 110 through a combination of coupling hardware and friction fit. Biasing device 152 further includes a collar 158. Spring adaptor assembly 114 is configured such that substantially unencumbered motion of biasing devices 152 in three dimensions is facilitated.

Spring adaptor assembly 114 includes a collet 160 coupled to biasing device 152 through a combination of hardware and friction fit. Collet 160 includes a biasing device coupling extension 162 that is received by collar 158. Collet 160 also includes a collet collar 164 configured to facilitate inserting biasing device coupling extension 162 into collar 158. Collet 160 further includes a plurality of collet arm segments 166 (only shown in FIG. 13) coupled to collet collar 164.

Spring adaptor assembly 114 further includes a collet nut 168 coupled to collet 160 through a combination of hardware and friction fit. Collet nut 168 defines a collet cavity 170 (only shown in FIG. 13) configured to receive and compress collet arm segments 166.

Figure 14:
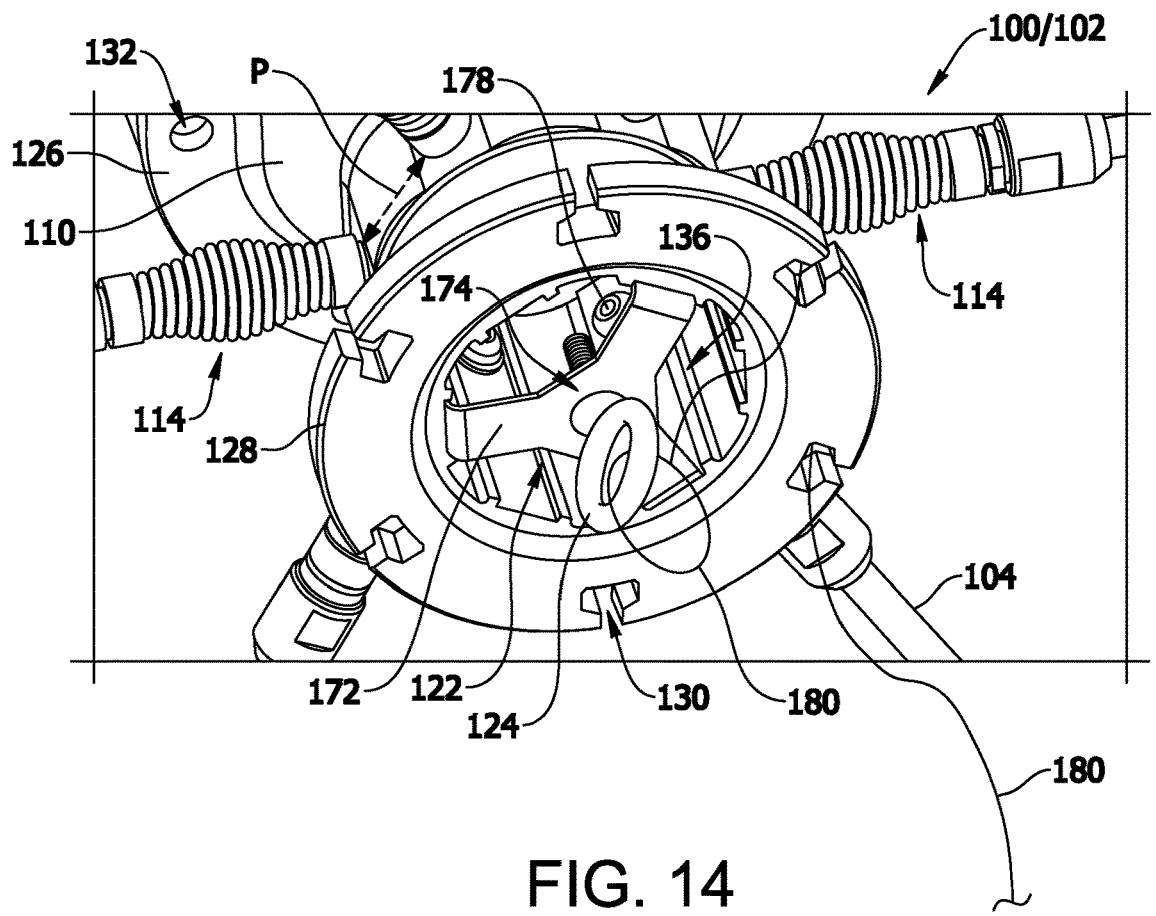
Figure 15:
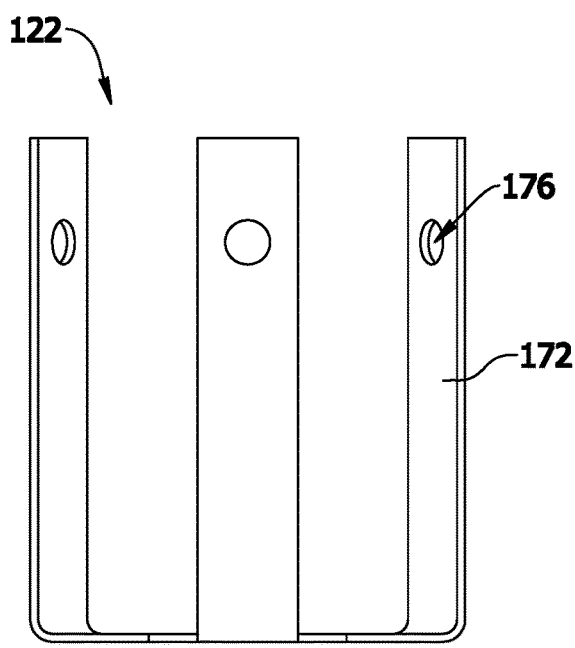

FIG. 14 is a schematic perspective bottom view of a portion of duck decoy deployment system 100. FIG. 15 is a schematic side view of anchor plate 122 that may be used with duck decoy deployment system 100. Anchor plate 122 includes a plurality of L-shaped members 172 (three shown) unitarily formed to define a threaded anchor eye bolt aperture 174 configured to receive anchor eye bolt 124. Alternatively, any means of assembling anchor plate 122 that enables operation of system 100 as described herein is used. In the exemplary embodiment, fastening hardware, such as a locknut (not shown) is used to secure receive anchor eye bolt 124 to anchor plate 122. Alternatively, any means are used to couple anchor eye bolt 124 to anchor plate 122 that enables operation of system 100 as described herein.

Anchor plate 122 is coupled to casing 110 through inserting anchor plate 122 into interior chamber 136, aligning fastener apertures 176 defined in each L-shaped member 172 with a corresponding fastener aperture (not shown) in casing 110, and inserting a fastener 178, such as, and without limitation, a cap screw with an accompanying lock washer (not shown) in the casing's fastener aperture. An anchor line 180, such as, and without limitation, nylon rope, is coupled to anchor eye bolt 124, looped about at least two line slots 130, and coupled to an anchor device (not shown) for facilitating substantially reducing a potential for translation of system 100 due to water currents. Line slots 130 are also configured to receive thrust bar system 300 therein, where line slots 130 are configured to couple thrust bar system 300 to casing 110 to facilitate motion of duck decoys 106 (shown in FIG. 1). A sufficient number of line slots 130 (six shown) facilitate coupling thrust bar system 300 using just two slots 130 while retaining two slots 130 for anchor line 180 as described above.

Figure 16:
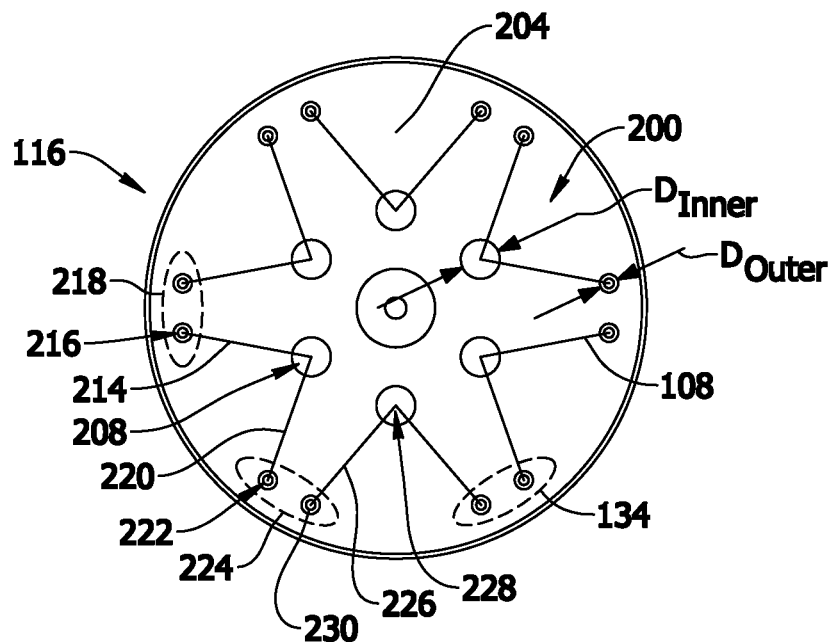
Figure 17:
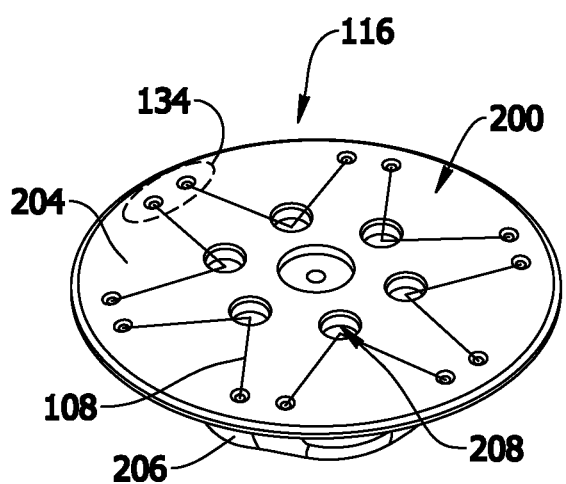
Figure 18:
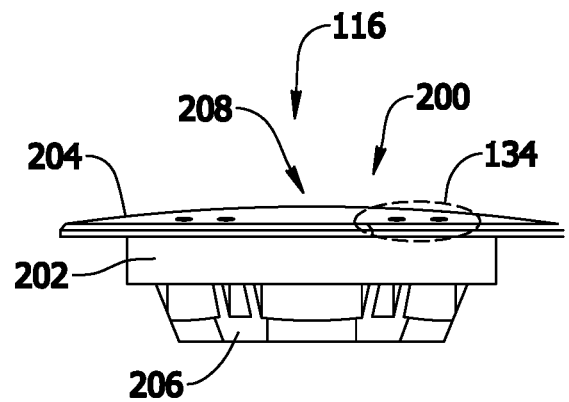
Figure 19:
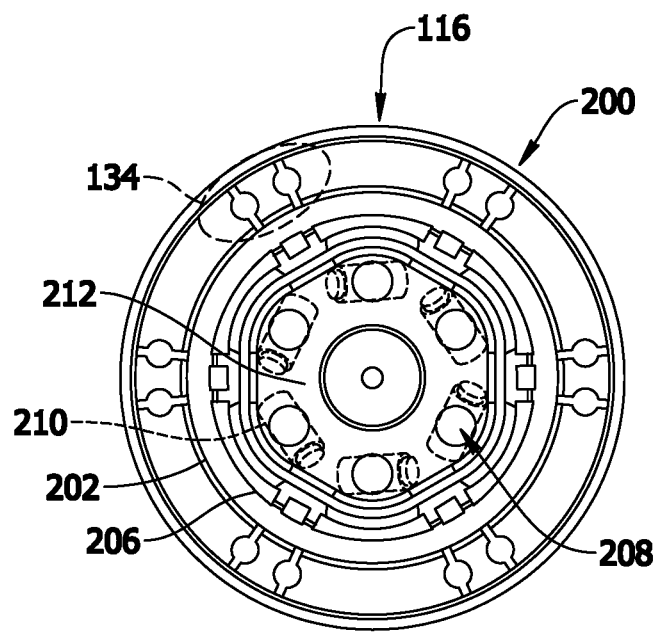

FIG. 16 is a schematic overhead view of hub cap 116 and a portion of an exemplary decoy tether guide subsystem 200. FIG. 17 is a schematic perspective overhead view of hub cap 116. FIG. 18 is a schematic side view of hub cap 116. FIG. 19 is a schematic bottom view of hub cap 116. Referring to FIGS. 16-19, hub cap 116 includes an outer lip 202 coupled to and extending from a top surface 204. Outer lip 202 contacts upper flange 126 of casing 110 (both shown in FIGS. 2-4) to define a stand-off distance between top surface 204 and flange 126 to facilitate routing tethers 108 (discussed further below). Hub cap 116 also includes an inner lip 206 that extends from top surface 204 a greater distance that outer lip 202. Inner lip 206 extends into interior chamber 136 to form a friction fit with casing 110 proximate upper flange 126 such that hub cap 116 remains removably coupled to casing 110.

Decoy tether guide subsystem 200 includes hub cap 116 and upper flange 126 of casing 110. Hub cap 116 includes a plurality of tether guides in the form of a plurality of radially inner decoy guide openings 208 and a plurality of radially outer decoy guide openings, i.e., pairs of tether guide openings 134. In the exemplary embodiment, radially inner decoy guide openings 208 and tether guide openings 134 are substantially circular. Radially inner decoy guide openings 208 have a diameter DInner and tether guide openings 134 have a diameter DOuter, where DInner is greater than DOuter. The values for diameter DOuter are selected to accommodate a plurality of tethers 108. The values for diameter DInner are selected to accommodate a single tether 108 to facilitate reducing a potential for entanglement of tethers 108. In a manner similar to tether guide openings 132 in upper flange 126 (both shown in FIG. 2) and pairs of tether guide openings 134, radially inner decoy guide openings 208 are positioned approximately 60° apart from each other along top surface 204 of hub cap 116. In general, radially inner decoy guide openings 208 are positioned about top surface 204 at circumferential positions of approximately 360 degrees divided by the number of radially inner decoy guide openings 208. Alternatively, radially inner decoy guide openings 208 and tether guide openings 134 have any shape, configuration, and orientation that enables operation of system 100 as described herein.

Also, in the exemplary embodiment, tethers 108 are terminated proximate radially inner decoy guide openings 208. Decoy tether guide subsystem 200 further includes a plurality of tether securing devices 210, each tether securing device 210 coupled to a respective tether 108. Moreover, each tether securing device 210 has a size and a configuration that facilitates devices 210 contacting a bottom surface 212 to reduce a potential for devices 210 to traverse through the associated radially inner decoy guide opening 208, thereby securing the associated tether 108 to the underside of hub cap 116.

Further, in the exemplary embodiment, each tether 108 extends upward from respective tether securing device 210 through respective radially inner decoy guide opening 208 to a respective tether guide openings 134 along top surface 204 of hub cap 116. Tether 108 extends downward through tether guide opening 134 and through tether guide opening 132 of upper flange 126 toward a respective arm 104 (shown in FIG. 2).

Moreover, referring to FIG. 16, in the exemplary embodiment, a first decoy tether 214 extends from a first radially inner decoy tether guide opening 208 to one radially outer decoy tether guide 216 of a first pair of radially outer decoy tether guides 218. Also, a second decoy tether 220 extends from first radially inner decoy tether guide opening 208 to another radially outer decoy tether guide 222 of a second pair of radially outer decoy tether guides 224 adjacent first pair of radially outer decoy tether guides 218. Further, a third decoy tether 226 extends from a second radially inner decoy tether guide 228 to another radially outer decoy tether guide 230 of second pair of radially outer decoy tether guides 224. Alternatively, tethers 108 are routed through decoy tether guide subsystem 200 with any routing configuration that enables operation of system 200 and system 100 as described herein.

Figure 20:
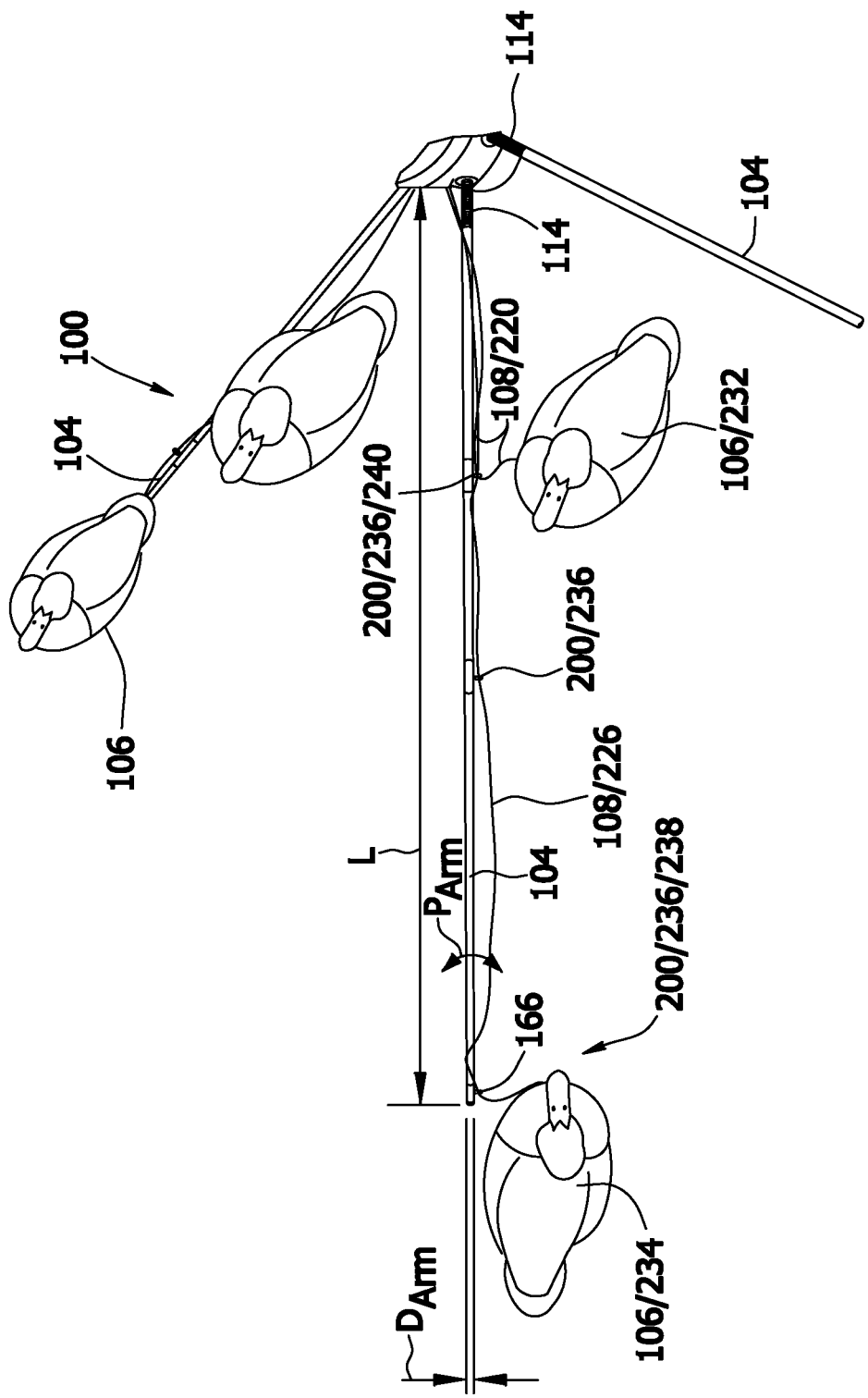

FIG. 20 is a schematic overhead view of deployably extendable and flexibly collapsible arm 104 and another portion of decoy tether guide subsystem 200 that may be used with duck decoy deployment system 100. In the exemplary embodiment, arm 104 has a fixed length L. Arm 104 has any length L that enables operation of system 100 as described herein. Second decoy tether 220 is coupled to arm 104 and a first duck decoy 232. Third decoy tether 226 is coupled to arm 104 and a second duck decoy 234. Arm 104 is substantially cylindrical in shape and defines a substantially constant diameter DArm and a circumferential perimeter PArm. Alternatively, arm 104 has any shape that enables operation of system 100 as described herein, including, without limitation, oval, rectangular, and varying diameters, thicknesses, and perimeters. Arm 104 has any values of diameter DArm and perimeter PArm that enable operation of system 100 as described herein.

Also, in the exemplary embodiment, duck decoys 106 and tethers 108 are coupled to arm 104 through a plurality of guide devices 236 that define a portion decoy tether guide subsystem 200 discussed further below. The radially outermost guide device 238 is positioned proximate the outermost end of arm 104 and the radially inner guide device 240 is positioned approximately 33% of arm length L from hub subsystem 102.

Figure 21:
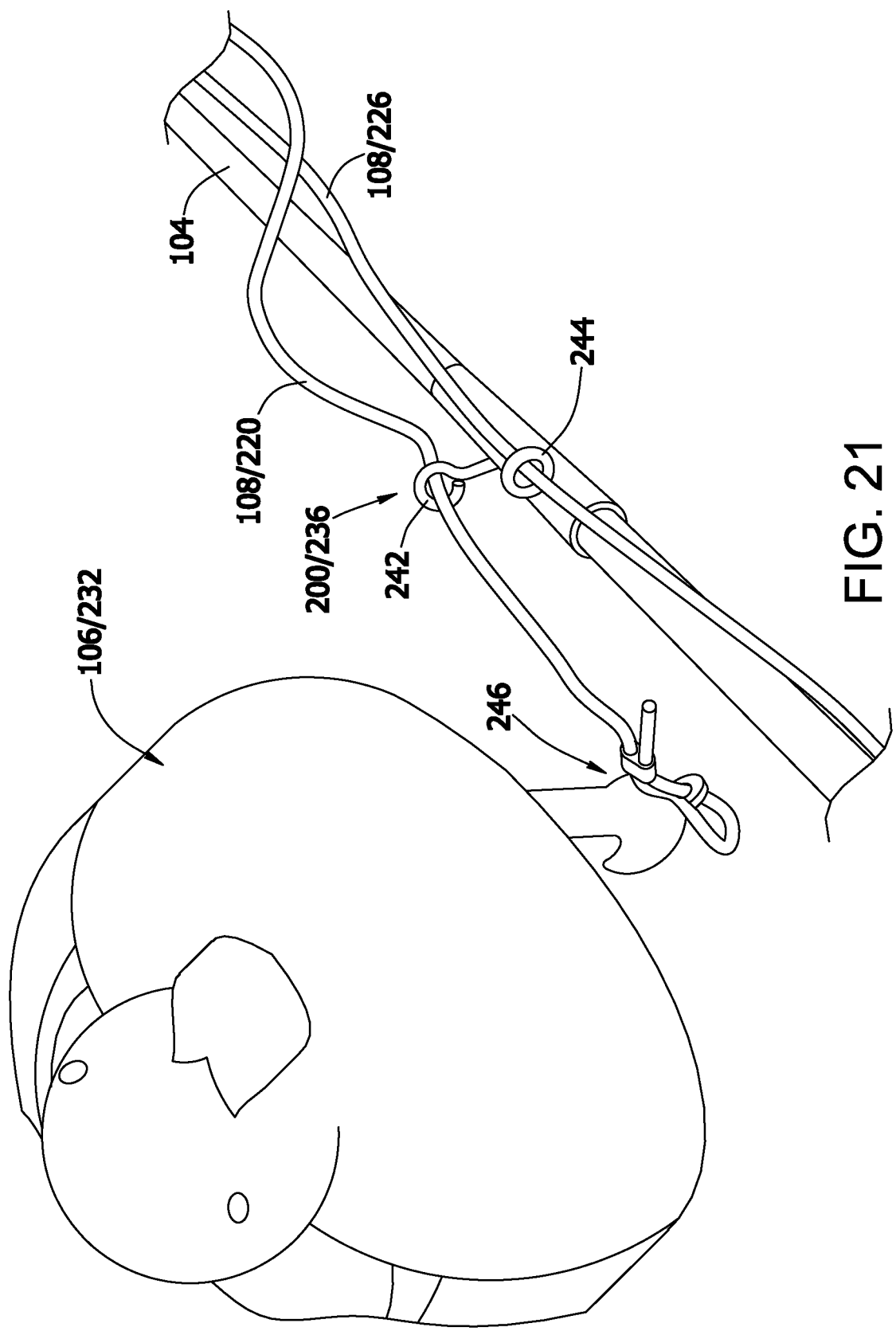
Figure 22:
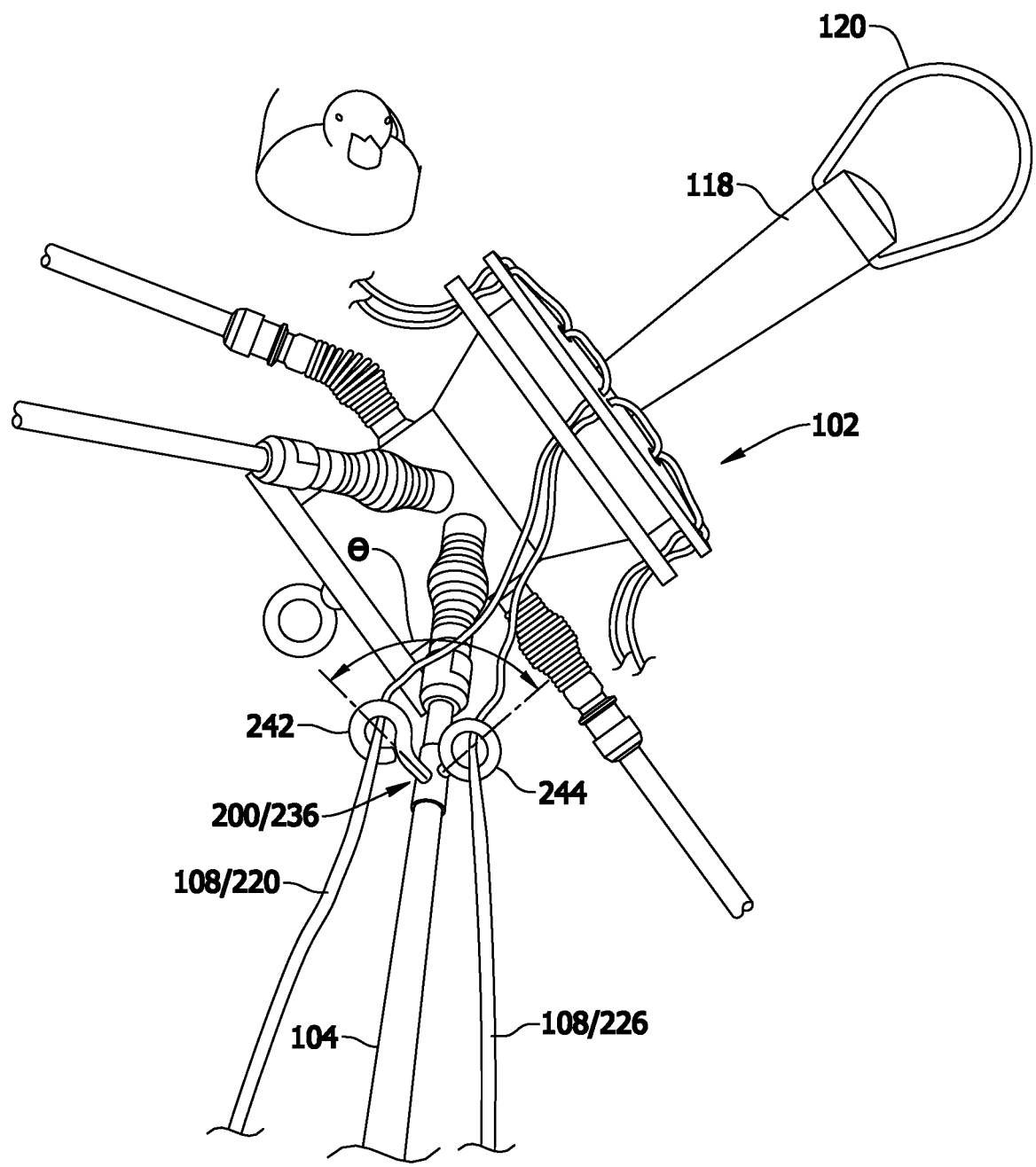
Figure 23:
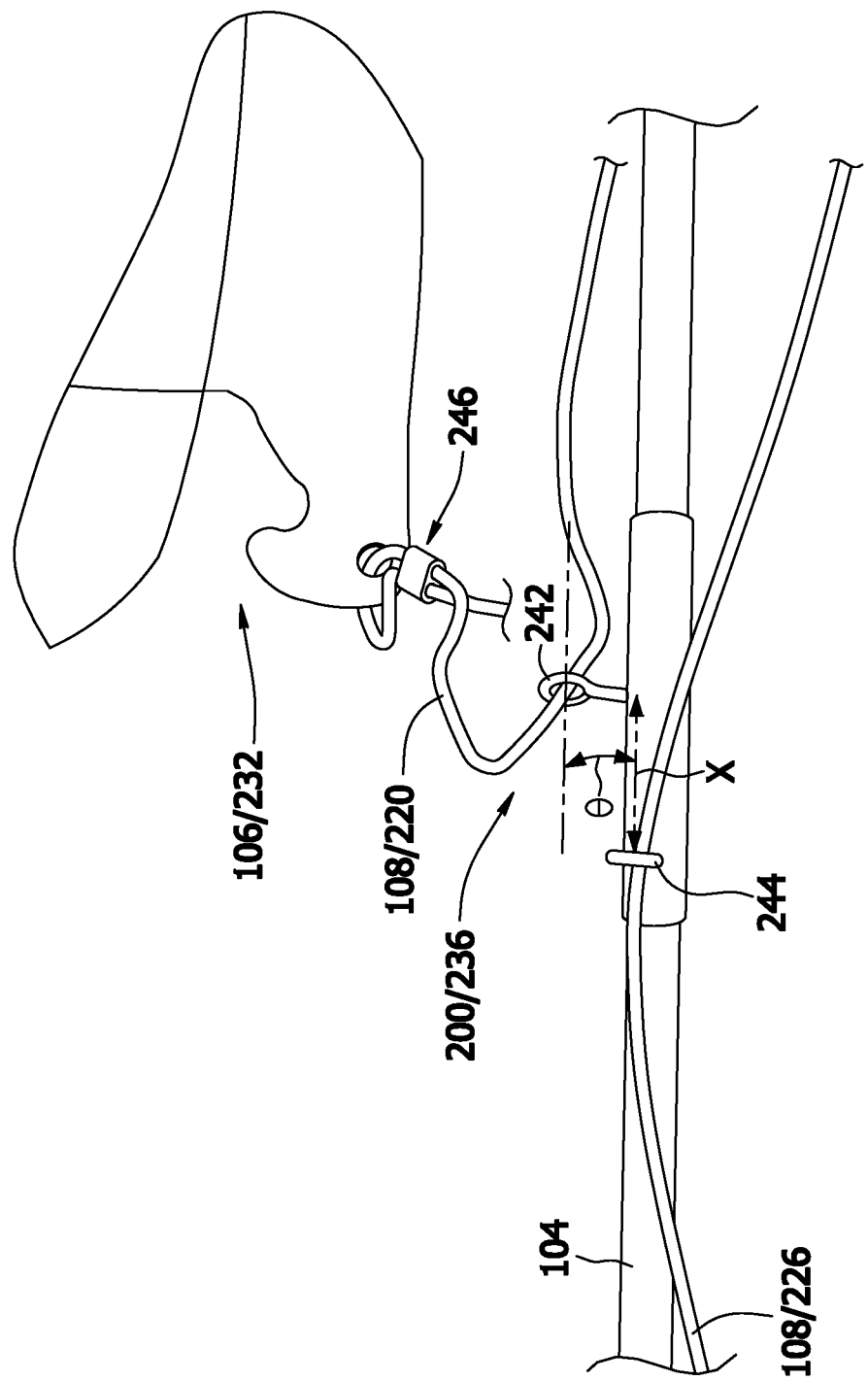

FIG. 21 is a schematic perspective view of a portion of deployably extendable and flexibly collapsible arm 104. FIG. 22 is a schematic longitudinal view of a portion of deployably extendable and flexibly collapsible arm 104. FIG. 23 is a schematic overhead view of a portion of deployably extendable and flexibly collapsible arm 104. A first guide device 242 and a second guide device 244 are coupled to arm 104 and positioned proximate each other. Guide devices 242 and 244 are eye bolts. Alternatively, guide devices 242 and 244 are any devices that enable operation of systems 100 and 200 as described herein, including, without limitation, tubular conduits.

First guide device 242 and second guide device 244 are indexed. i.e., they are separated with an angle θ and a distance X. Angle θ includes values within a range between approximately 30° and 45°, where in the exemplary embodiment angle θ is approximately a 45° angle. Distance X has a value of approximately 1.5 inches (38.1 mm). Alternatively, angle θ and distance X have any values that enable operation of system 100 as described herein. First guide device 242 and second guide device 244 are indexed to facilitate significantly reducing a potential for second decoy tether 220 and third decoy tether 226 to become entangled with each other. Second decoy tether 220 is threaded through first guide device 242 and third decoy tether 226 is threaded through second guide device 244. Second decoy tether 220 is coupled to first duck decoy 232 through a coupling device 246. In the exemplary embodiment, coupling device 246 is a crimped fastener. Alternatively, any coupling device that enables operation of systems 100 and 200 as described herein is used, including, and without limitation, waterproof tape.

Figure 24:
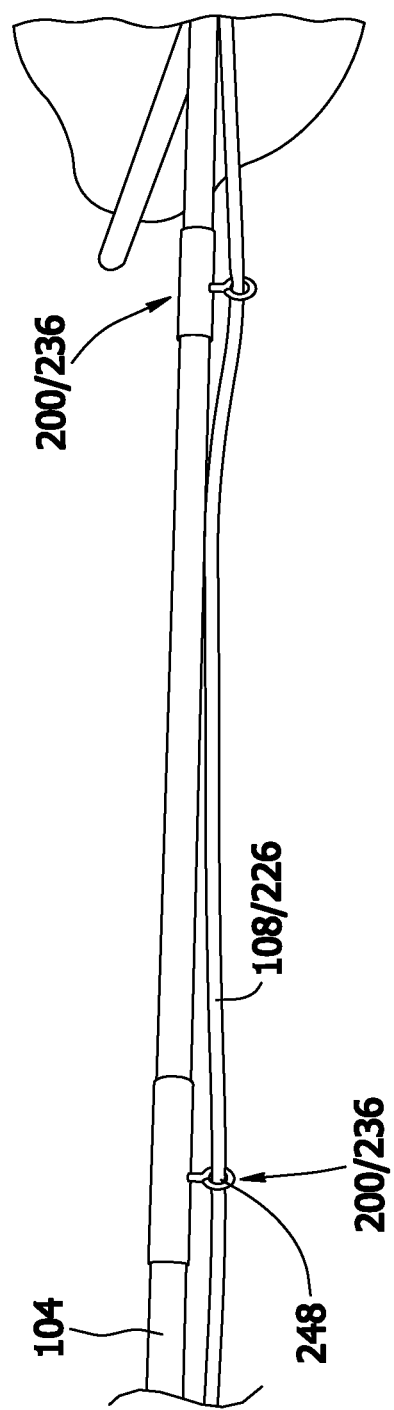
Figure 25:
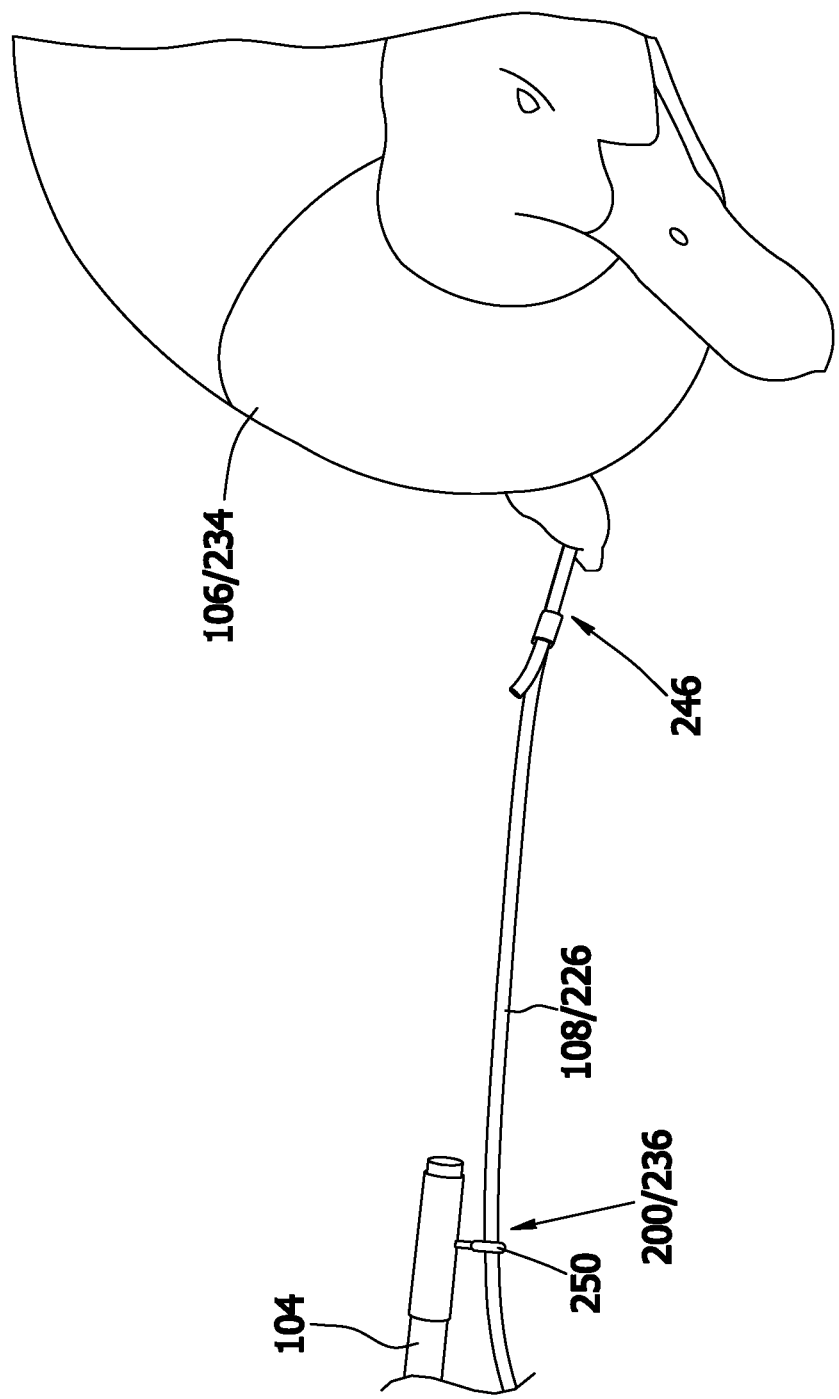

FIG. 24 is a schematic perspective view of another portion of deployably extendable and flexibly collapsible arm 104. FIG. 25 is another schematic perspective view of the portion of deployably extendable and flexibly collapsible arm 104. Decoy tether guide subsystem 200 includes a third guide device 248 (only shown in FIG. 24) and a fourth guide device 250 (only shown in FIG. 25). Guide devices 248 and 250 are eye bolts. Alternatively, guide devices 248 and 250 are any devices that enable operation of systems 100 and 200 as described herein, including, without limitation, tubular conduits.

Third decoy tether 226 is threaded through third guide device 248 and fourth guide device 250. Third decoy tether 226 is coupled to second duck decoy 234 through coupling device 246. In the exemplary embodiment, coupling device 246 is a crimped fastener. Alternatively, any coupling device that enables operation of systems 100 and 200 as described herein is used, including, and without limitation, waterproof tape.

Referring to FIGS. 1 through 25, in operation, duck decoy deployment system 100 is initially in a folded or collapsed condition, where arms 104 are substantially parallel to the longitudinal direction and handle device 118. As such, spring adaptor assemblies 114 have approximately a 90° bend upward. System 100 is lifted by handle device 118, and an anchor line 180 is coupled to anchor eye bolt 124, looped about at least two line slots 130, and coupled to an anchor device for facilitating substantially reducing a potential for translation of system 100 due to water currents. Line slots 130 are also configured to receive motive device or thrust bar system 300 therein, where line slots 130 are configured to couple thrust bar system 300 to casing 110 to facilitate motion of duck decoys 106. System 100 is dropped into water of a predetermined depth, e.g., and without limitation, within a range between approximately 20 feet (6.1 meters) and 25 feet (7.6 meters).

While in the collapsed position, arms 104 are restrained with any restraining device that enables operation of system 100 as described herein, including, without limitation, a restraining band and rope. The restraining device is removed and arms 104 drop through gravity into the water into the extended, i.e., deployed condition. Hub subsystem 102 and the weight pull hub subsystem 102 and thrust bar system 300 below the surface of the water toward the bottom with a gradual submergence over time in contrast to a rapid sinking. As such, the weight coupled to anchor eye bolt 124 is selected based on the weight and buoyancy of system 100 as a whole, thereby establishing a relative neutral buoyancy for system 100. In some embodiments, the weight attached to eye bolt 124 includes enclosure 312 of thrust bar system 300 having power source 314 and programming device 316 positioned therein. Arms 104 drop below the surface of the water and the buoyant duck decoys 106 float on the surface, thereby preventing further sinking of arms 104. Hub subsystem 102 eventually sits within a range between approximately 12 inches (30.5 centimeters (cm)) and 24 inches (61 cm) below the surface of the water, at least partially depending on the length of tethers 108. As such, with the exception of decoys 106, system 100 is substantially submerged and not visible to incoming waterfowl.

As arms 104 drop, each decoy tether 108 slides through the respective guide device 242, 244, 248, 250 and is at least partially restrained by the respective tether securing device 210, radially inner decoy guide opening 208, radially outer decoy tether guide 216 of the pair of tether guide openings 134, and tether guide opening 132 in upper flange 126. Such restraint of tethers 108 facilitates significantly decreasing entanglement of tethers 108 during deployment of system 100. Also, the indexing of guide devices 236 of decoy tether guide subsystem 200 as described above facilitates ease of deployment of system 100.

Hub subsystem 102 is free to rotate with the natural currents of the water and the wind. Therefore, arms 104, with duck decoys 106, are free to rotate with hub subsystem 102 with movements that simulate natural duck movements.

Also, in operation, system 100 is retrieved through grabbing hub subsystem 102 through wire loop 120 coupled to handle 138, lifting system 100 out of the water, and placing into a bag-like transport device to place arms 104 into the collapsed position. Restraint and indexing of tethers 108 for deployment as describe above also facilitates significantly decreasing entanglement of tethers 108 during recovery of system 100.

The exemplary methods and apparatus described herein overcome at least some disadvantages of known waterfowl decoy deployment systems by providing a motive mechanism, i.e., a thrust bar system that induces motive forces in floating decoys to simulate natural duck swimming movements on the surface of the water. Specifically, the thrust bar system uses a plurality of small electric motor-driven propellers to induce a substantially circular swimming motion to a tethered duck decoy system that includes a plurality of decoys. The electric power source is one of a waterproof rechargeable DC battery that is submerged in the vicinity of the decoy deployment system and/or an energy storage and delivery system that may be on-shore or on a nearby floating platform out of view of passing ducks, i.e., in nearby duck blinds.

An exemplary technical effect of the above-described waterfowl decoy deployment systems, hub subsystems, deployably extendable and flexibly collapsible arms, and decoy tether guide subsystem and methods includes at least one of the following: (a) simplifying deployment and retrieval of a large number of duck decoys while mitigating entanglement of the decoys and their tethers; (b) using a hub cap on the top of a casing of a hub subsystem as a portion of the decoy tether guide subsystem to route the plurality of tethers from the hub cap to a plurality of deployably extendable and flexibly collapsible arms, where another portion of the decoy tether guide subsystem routes the individual tethers to the respective decoys through indexed tether guides; (c) facilitating coupling and securing an anchor weight to the hub subsystem through looping about at least two line slots defined in a bottom flange of the hub subsystem casing; and (d) facilitating coupling of a motive device, or thrust bar system, to the waterfowl decoy deployment system through at least two line slots defined in a bottom flange of the hub subsystem casing such that the thrust bar system induces motive forces in floating decoys to simulate natural duck swimming movements on the surface of the water.

Exemplary embodiments of a motive system for a waterfowl decoy deployment system are described above in detail. The motive system is not limited to the specific embodiments described herein, but rather, components of the apparatus may be utilized independently and separately from other components described herein. For example, the features of the motive system for a waterfowl decoy deployment system described herein may also be used in combination with other deployment systems that call for rapid and easy deployment and recovery.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A waterfowl decoy deployment system comprising:
a hub including a sidewall defining an interior chamber;
a plurality of arms coupled to said hub such that said plurality of arms extend radially outward from said hub;
a biasing device extending radially outward from said sidewall and coupling a first arm of said plurality of arms to said hub, said biasing device being configured to bend along at least a portion of a length of said biasing device to facilitate moving said first arm in a plurality of dimensions relative to said hub; and
a thrust device coupled to said hub such that said thrust device is positioned outside said chamber, wherein said thrust device includes a motor, a shaft coupled to said motor, and a propeller coupled to said shaft, wherein said motor is operable to drive rotation of said propeller to propel said thrust device within an aqueous environment and induce motion to said plurality of arms.

2. The waterfowl decoy deployment system in accordance with claim 1, wherein said biasing device facilitates positioning said first arm between a collapsed configuration, in which said first arm is oriented in a longitudinal direction relative to said hub and said biasing device has a generally transverse bend, and a deployed configuration, in which said first arm radiates outwards from said hub.

3. The waterfowl decoy deployment system in accordance with claim 1, wherein said hub comprises an arcuate sidewall that defines the interior chamber and further defines a first arm aperture extending through said arcuate sidewall, said biasing device extending at least partially through the first arm aperture.

4. The waterfowl decoy deployment system in accordance with claim 3, wherein said biasing device comprises a spring and a collar coupled to said spring.

5. The waterfowl decoy deployment system in accordance with claim 1 further comprising a hub cap coupled to said hub and configured to at least partially define said interior chamber.

6. The waterfowl decoy deployment system in accordance with claim 1 further comprising a power source coupled to said thrust device, wherein said power source is configured to provide electrical power to said motor.

7. The waterfowl decoy deployment system in accordance with claim 6 further comprising an enclosure configured to house said power source therein, wherein said enclosure is configured to be submerged beneath a water line.

8. The waterfowl decoy deployment system in accordance with claim 1 further comprising a programming device coupled to said thrust device, wherein said programing device is configured to control operation of said thrust device, wherein said programming device is configured to change the direction of rotation of said propeller.

9. The waterfowl decoy deployment system in accordance with claim 1 further comprising:
an enclosure;
a power source housed within said enclosure and coupled to said thrust device, wherein said power source is configured to provide electrical power to said thrust device; and
a programming device housed within said enclosure and coupled to said thrust device, wherein said programing device is configured to control operation of said thrust device.

10. The waterfowl decoy deployment system in accordance with claim 1 further comprising:
a plurality of waterfowl decoys, wherein at least one waterfowl decoy of said plurality of waterfowl decoys is coupled to each arm of said plurality of arms; and
a plurality of decoy tethers, wherein each waterfowl decoy of said plurality of waterfowl decoys is coupled to a respective arm of said plurality of arms using a decoy tether of said plurality of decoy tethers.

11. The waterfowl decoy deployment system in accordance with claim 1, wherein said thrust device is operable to rotate said hub within the aqueous environment.

12. A waterfowl decoy deployment system comprising:
a hub including a sidewall defining an interior chamber;
a plurality of arms, each arm of said plurality of arms including a first end coupled to said hub and a second distal end, said plurality of arms extending outward from said hub;
a plurality of decoys, each decoy of said plurality of decoys coupled to a corresponding arm of said plurality arms at said second ends of said arms;
a biasing device extending radially outward from said sidewall and coupling a first arm of said plurality of arms to said hub, said biasing device being configured to bend along at least a portion of a length of said biasing device to facilitate moving said first arm in a plurality of dimensions relative to said hub; and
a thrust device coupled to said hub, said thrust device comprising a motor, a shaft coupled to said motor, and a propeller coupled to said shaft, wherein said motor is operable to drive rotation of said propeller to propel said thrust device within an aqueous environment and induce motion to said plurality of decoys.

13. The waterfowl decoy deployment system in accordance with claim 12, wherein said biasing device facilitates positioning said first arm between a collapsed configuration, in which said first arm is oriented in a longitudinal direction relative to said hub and said biasing device has a generally transverse bend, and a deployed configuration, in which said first arm radiates outwards from said hub.

14. The waterfowl decoy deployment system in accordance with claim 12, wherein said hub comprises an arcuate sidewall that defines the interior chamber and further defines a first arm aperture extending through said arcuate sidewall, said biasing device extending at least partially through the first arm aperture.

15. The waterfowl decoy deployment system in accordance with claim 14, wherein said biasing device comprises a spring and a collar coupled to said spring.

16. The waterfowl decoy deployment system in accordance with claim 12 further comprising a hub cap coupled to said hub and configured to at least partially define said interior chamber.

17. The waterfowl decoy deployment system in accordance with claim 12 further comprising a power source coupled to said thrust device, wherein said power source is configured to provide electrical power to said motor.

18. The waterfowl decoy deployment system in accordance with claim 17 further comprising an enclosure configured to house said power source therein, wherein said enclosure is configured to be submerged beneath a water line.

19. The waterfowl decoy deployment system in accordance with claim 12 further comprising a programming device coupled to said thrust device, wherein said programming device is configured to control operation of said thrust device, wherein said programming device is configured to change the direction of rotation of said propeller.

20. The waterfowl decoy deployment system in accordance with claim 12, wherein said thrust device is operable to rotate said hub within the aqueous environment.

* * * * *